Jan. 31, 1961  M. G. SHENIGO  2,969,719
MEANS FOR FORMING PAPERBOARD CONTAINERS
Filed May 26, 1959  14 Sheets-Sheet 1
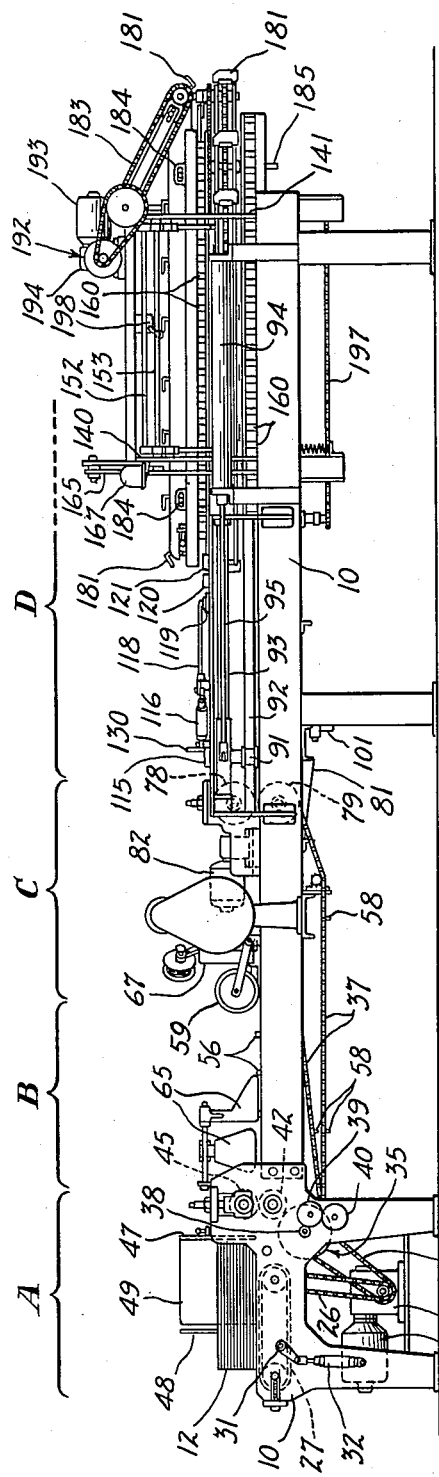
Fig. 2
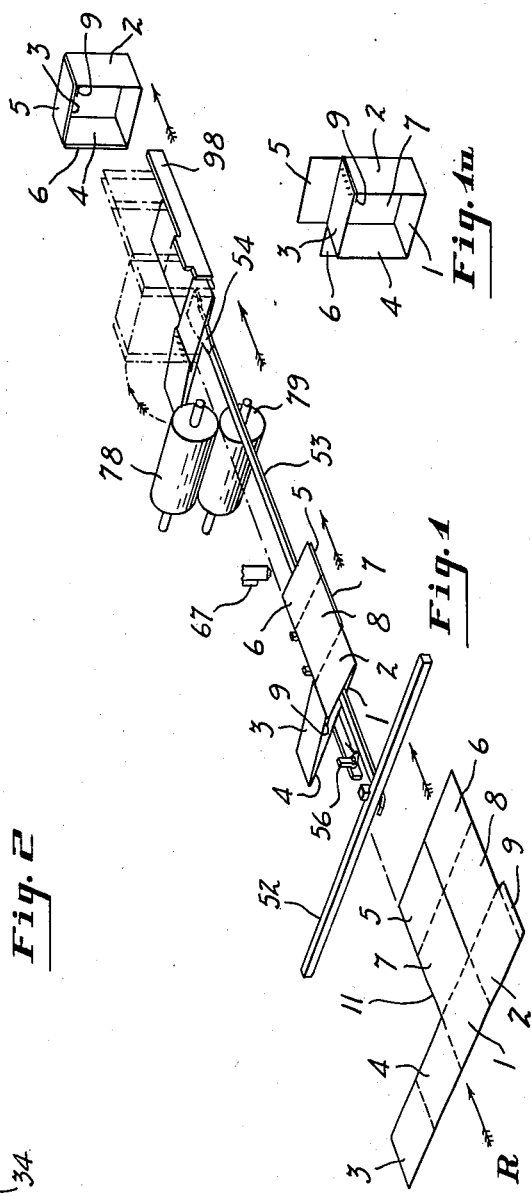
Fig. 1
Fig. 1a
INVENTOR
Michael G. Shenigo
BY Evans & Hearne
ATTORNEYS Jan. 31, 1961 M. G. SHENIGO 2,969,719
MEANS FOR FORMING PAPERBOARD CONTAINERS
Filed May 26, 1959 14 Sheets-Sheet 2
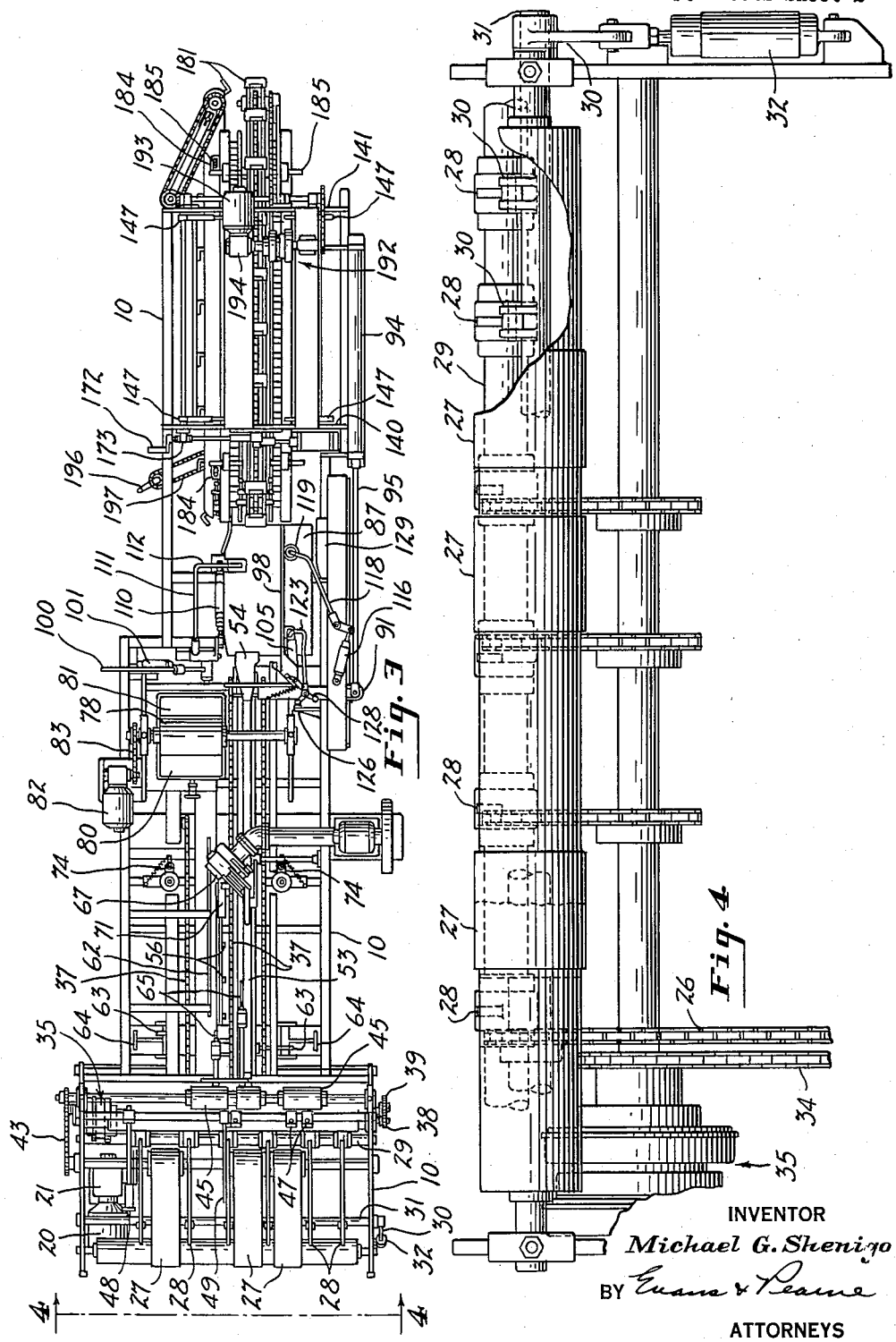
INVENTOR
Michael G. Shenigo
BY Evans & Pearne
ATTORNEYS Jan. 31, 1961
M. G. SHENIGO
2,969,719
MEANS FOR FORMING PAPERBOARD CONTAINERS
Filed May 26, 1959
14 Sheets-Sheet 4
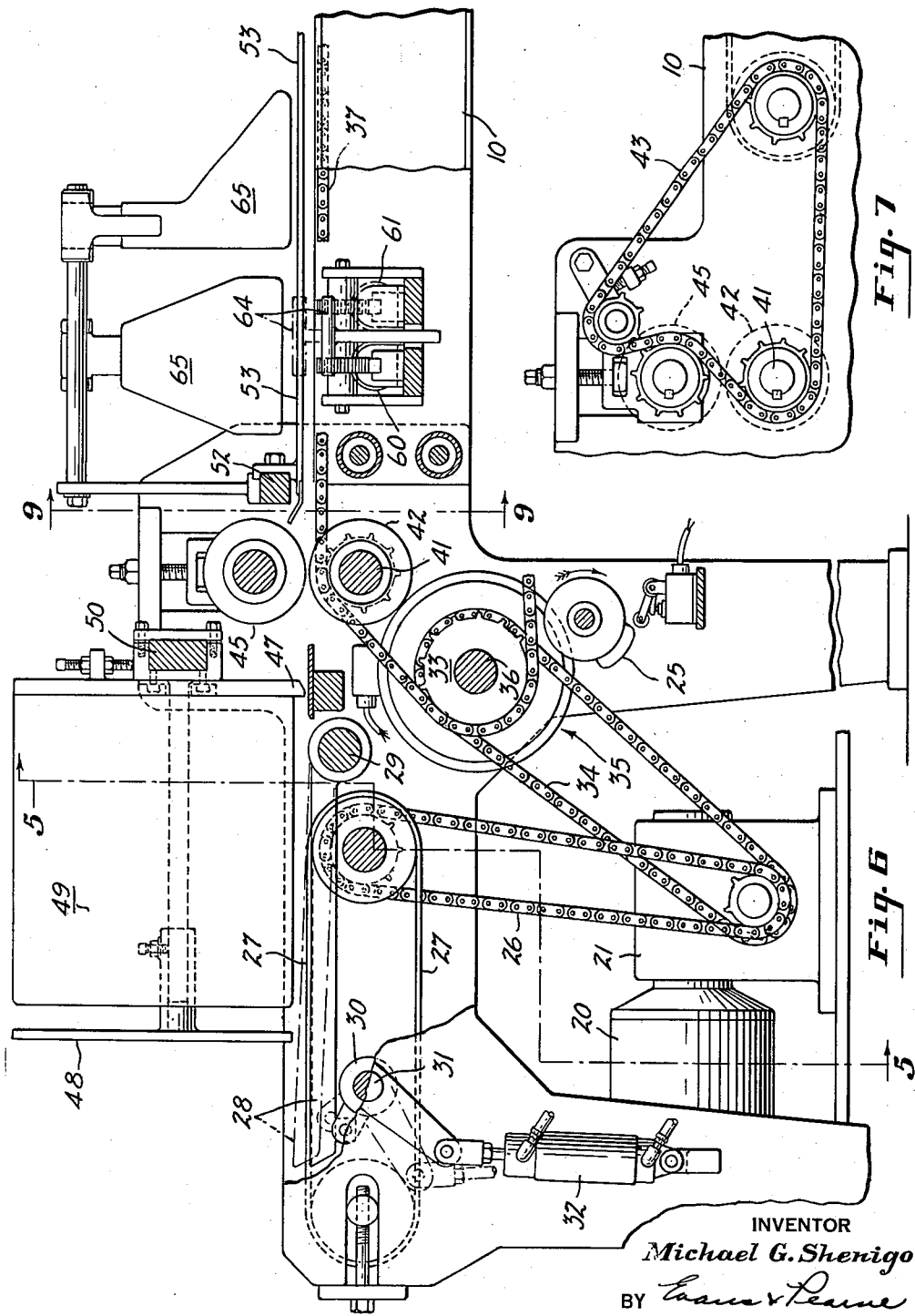
INVENTOR
*Michael G. Shenigo*
BY
ATTORNEYS Jan. 31, 1961　　　M. G. SHENIGO　　　2,969,719
MEANS FOR FORMING PAPERBOARD CONTAINERS
Filed May 26, 1959　　　14 Sheets-Sheet 5
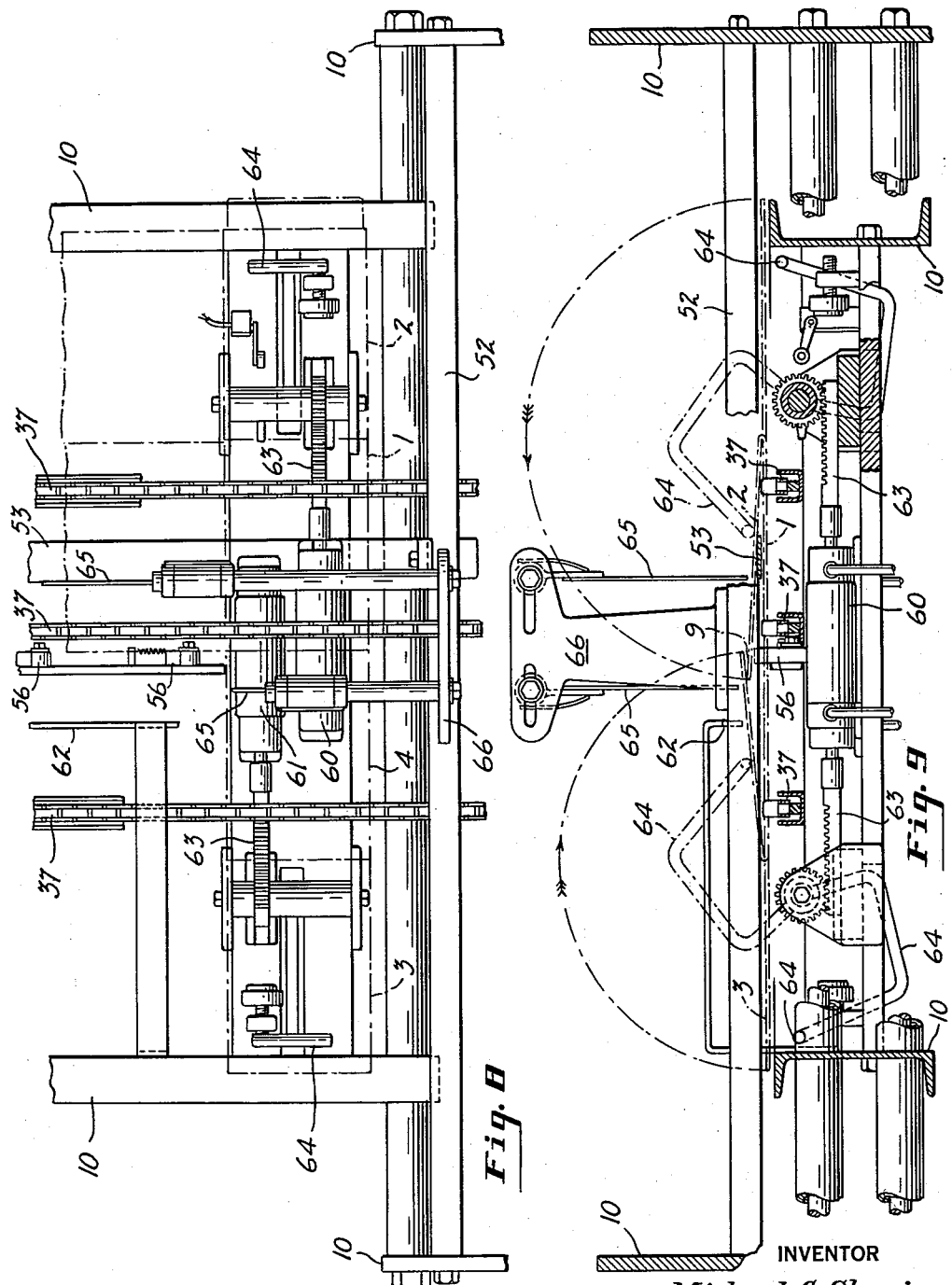
INVENTOR
Michael G. Shenigo
BY
ATTORNEYS INVENTOR
Michael G. Shenigo
BY
ATTORNEYS

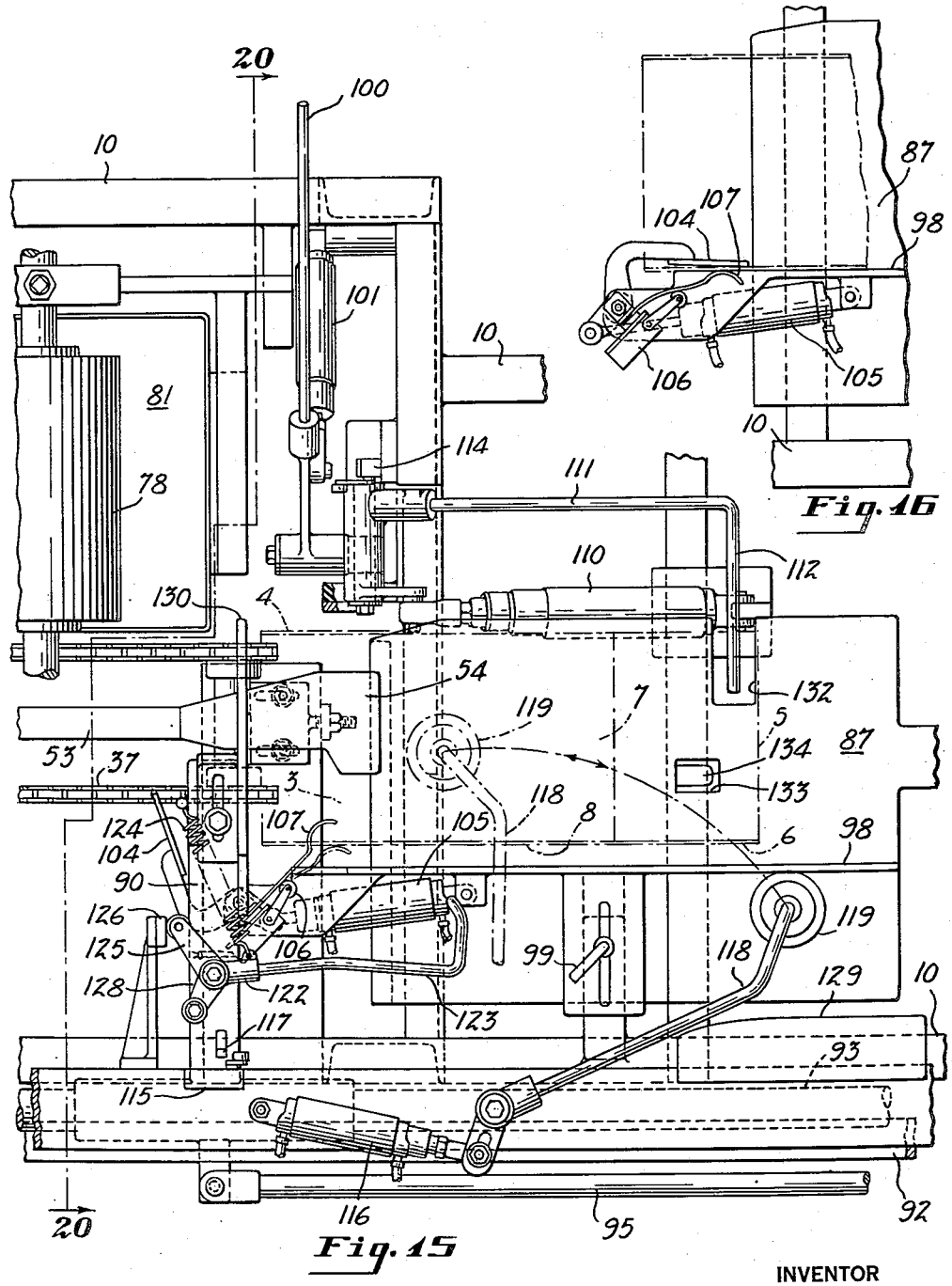

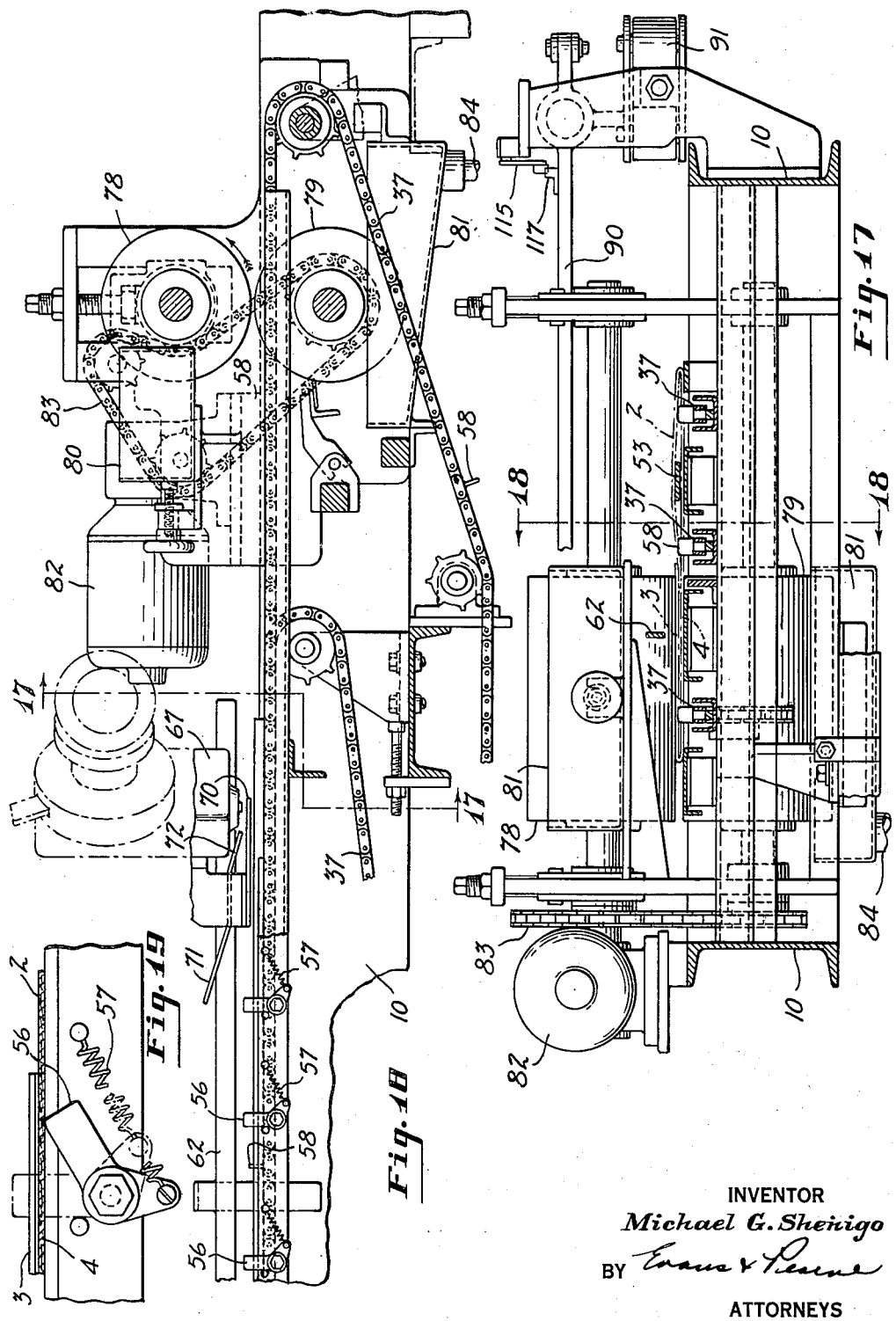

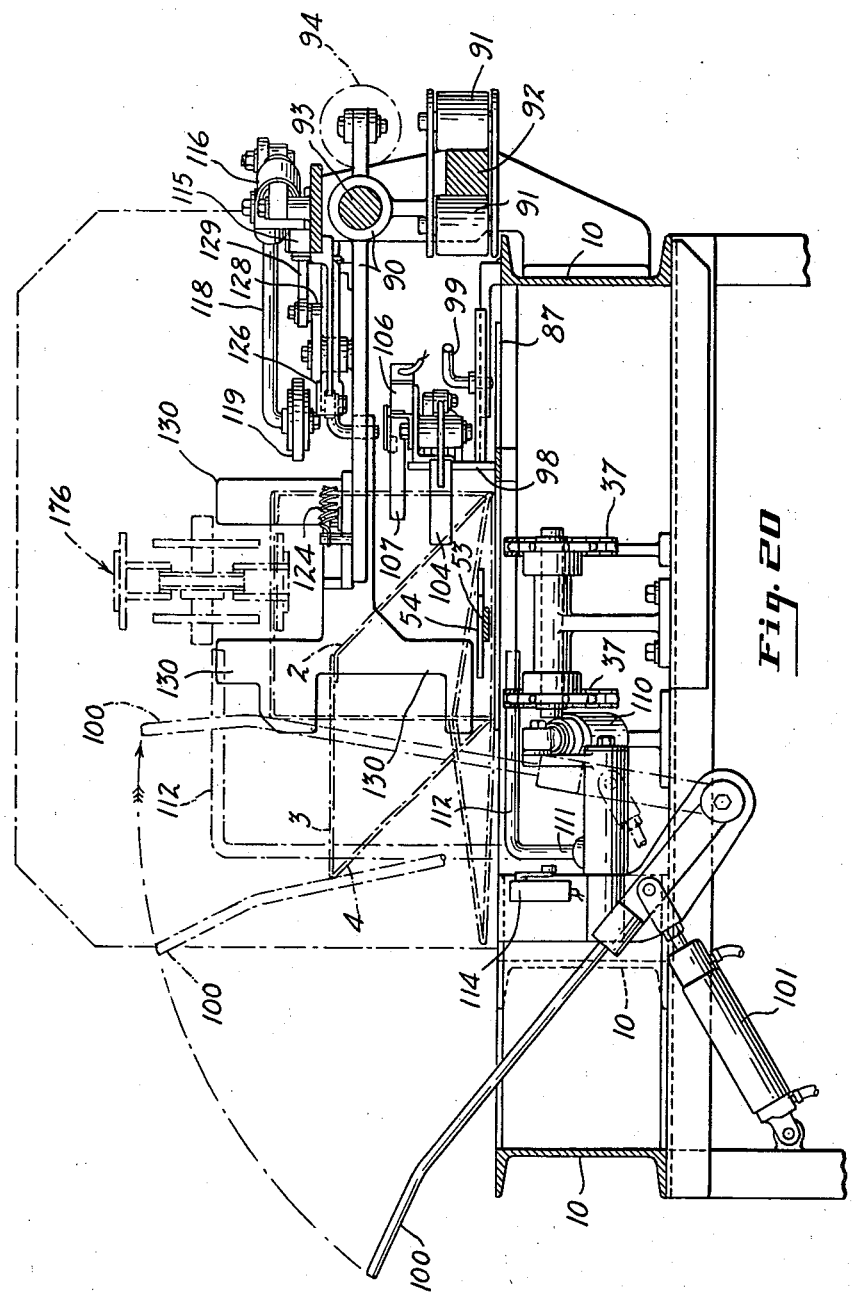

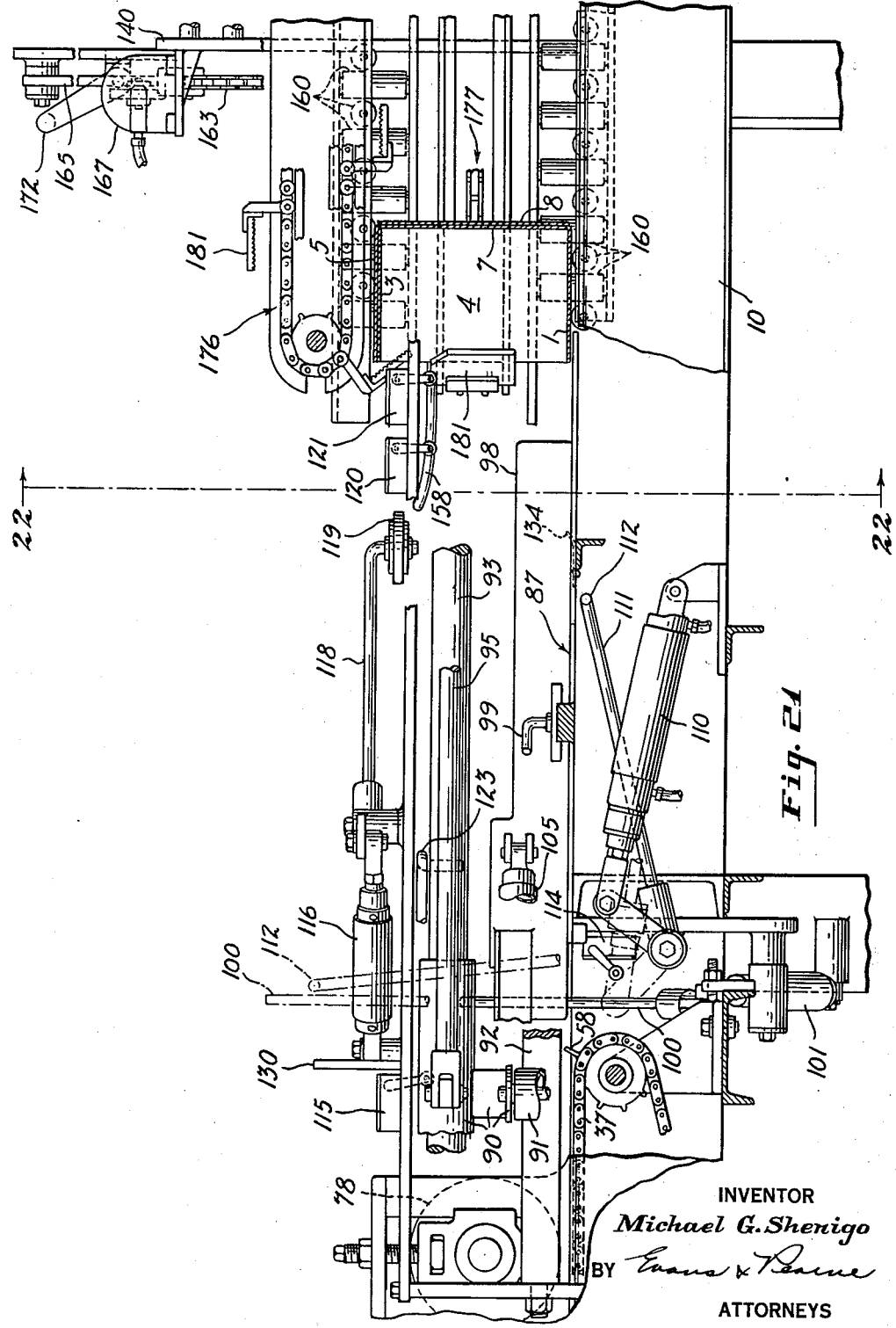

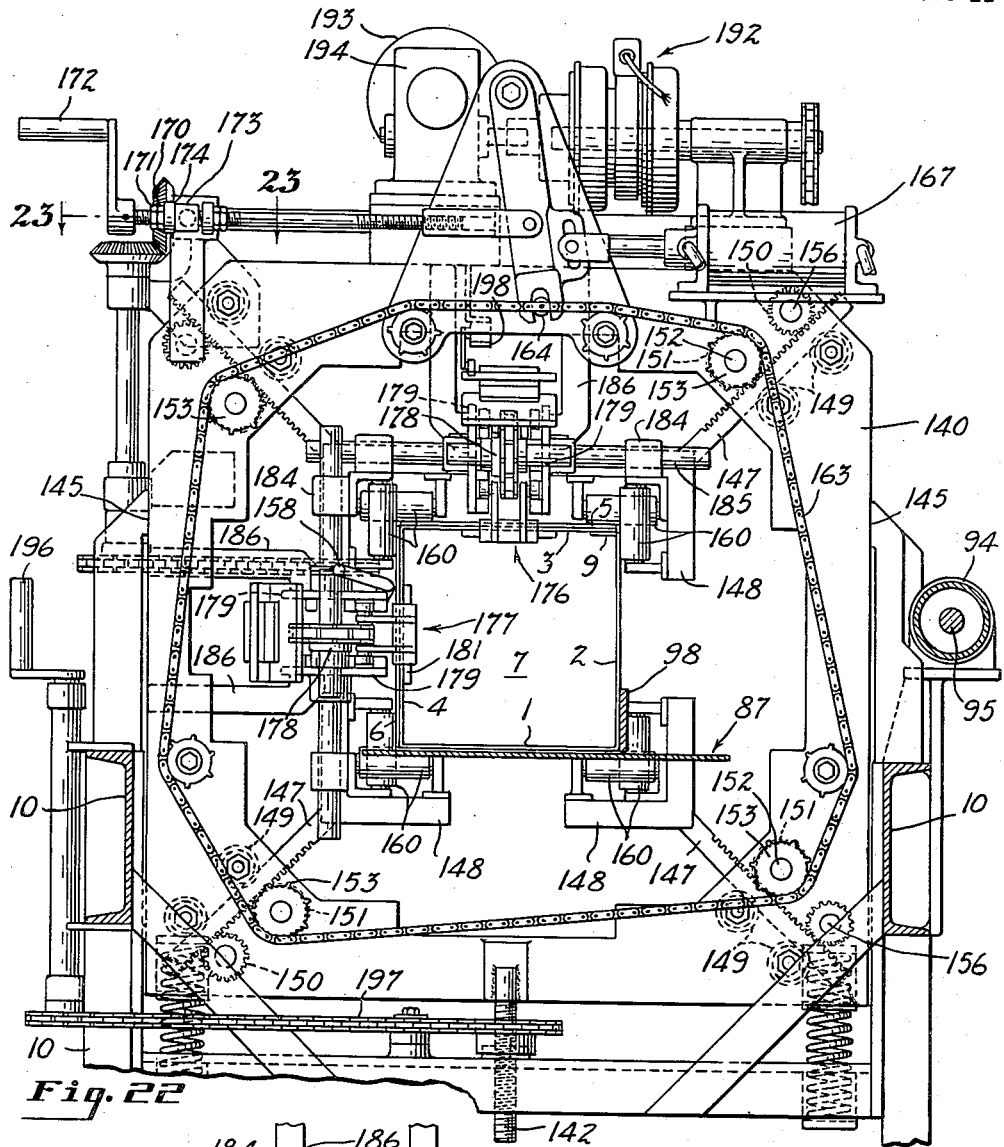
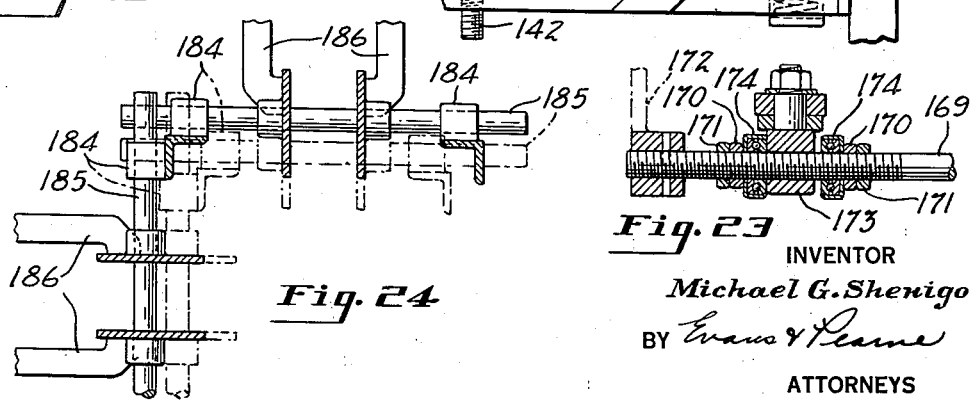

INVENTOR
Michael G. Shenigo
BY
ATTORNEYS

Jan. 31, 1961 M. G. SHENIGO 2,969,719
MEANS FOR FORMING PAPERBOARD CONTAINERS
Filed May 26, 1959 14 Sheets-Sheet 13

INVENTOR
Michael G. Shenigo
BY Evans & Pearne
ATTORNEYS

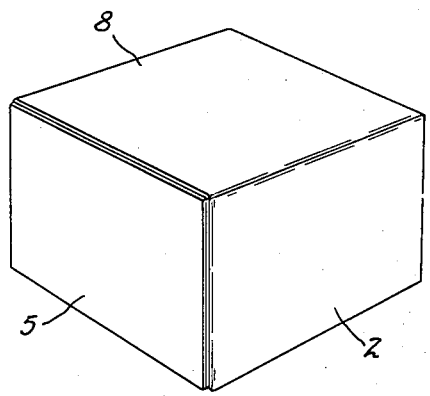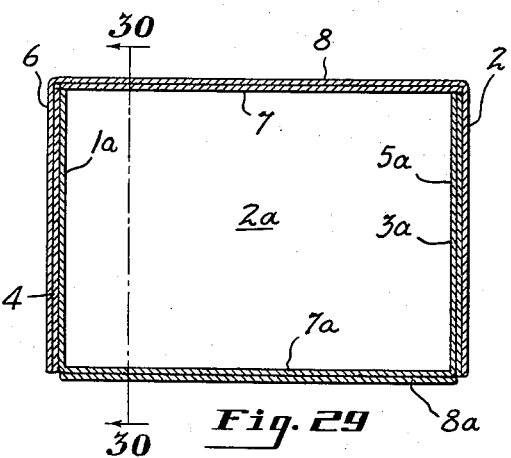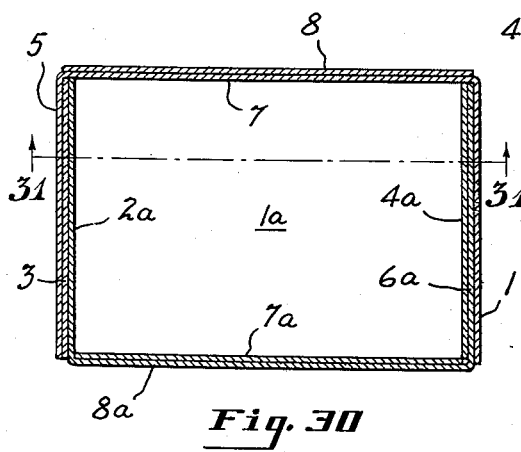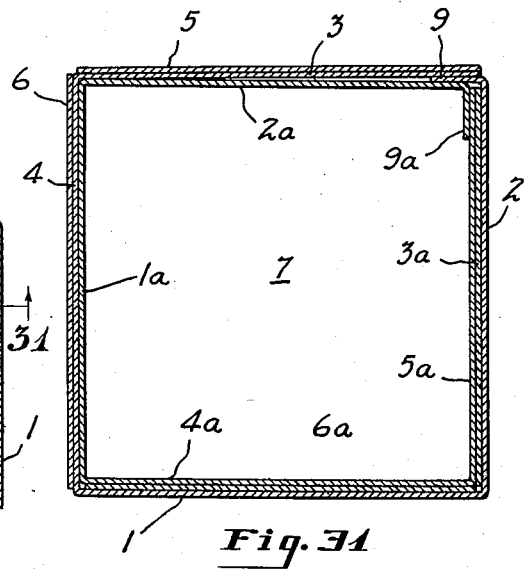

United States Patent Office 2,969,719
Patented Jan. 31, 1961

2,969,719

MEANS FOR FORMING PAPERBOARD CONTAINERS

Michael G. Shenigo, Sandusky, Ohio, assignor to West Virginia Pulp & Paper Company, New York, N.Y., a corporation of Delaware Filed May 26, 1959, Ser. No. 816,022

20 Claims. (Cl. 93—49)

This invention relates to packaging apparatus and methods and particularly to the packaging of relatively small amounts of loose heavy material, such as nails or other matter.

In recent years high-strength paperboard containers have come into widespread use in packaging applications where wooden kegs and the like were formerly used. An outstanding example is the packaging of nails. In the nail industry it has become widespread practice to package nails in bulk in paperboard containers which are of lower cost than kegs but which have high stack strength and all other necessary properties.

A highly successful form of paperboard nail container comprises an inner box and a cover box of similar construction except that the cover box is made slightly larger than the inner box so that its internal dimensions correspond to the external dimensions of the inner box to permit the outer box to telescopically receive the inner box.

In many instances it is highly advantageous to reduce handling costs by shipping carton blanks in the flat from the paper manufacturer to the manufacturer of the materials to be packaged and to erect the containers at the point where they will be filled with the material to be packaged. This requires reliable erecting equipment which can operate at high capacity. The present invention contemplates the erection of container blanks by means which are independent of the specific dimensions of the container, so that container sections or boxes of a variety of sizes may be processed through the same means. This has obvious cost advantages when the manufacturer of nails or other articles is packaging a product in containers of a variety of sizes. It has the same advantages where the types of containers being manufactured are those of the above-mentioned type comprising inner and outer box sections which differ from each other in lateral dimensions.

In an even broader aspect, the invention is advantageous in that it provides for the reliable and relatively trouble-free erection of paperboard container elements through a novel organization of blank manipulating sequences. Thus, the invention may be used to advantage even in the erection of a single blank for a single non-telescoping box or container. In general, containers which are pertinent to the invention comprise blanks having four tube panels including first and second endward tube panels and first and second centerward tube panels with a seam tab hinged to one of the endward tube panels. The invention contemplates the arrangement of blank manipulating and erecting steps with reference to a central line or locus with seaming operations occurring at the central reference line and with guiding of the blank occurring at the central reference line, all in such a way as to enable the complex erecting operations to be carried out in similar sequences and with similar results with varying sizes of blanks.

The above and other objects and advantages of the invention will become apparent from the following description of one example of the invention. This example illustrates presently preferred means and apparatus and will enable those in the industry to practice the invention for purposes of evaluation and trial, either by duplication of the illustrated means or apparatus or models thereof or the alteration of some of the several details thereof to provide alternative means embodying the principles and teaching of the invention.

In the drawings:

Figure 1 is a sketch illustrating schematically the practice of the invention.

Figure 1a illustrates the partially erected cover box section.

Figure 2 is a side elevation of apparatus embodying the invention.

Figure 3 is a plan view of the apparatus shown in Figure 2.

Figure 4 is a view on an enlarged scale taken from line 4—4 in Figure 3.

Figure 6 is a side elevation partly in cross-section taken at station A, as such station is indicated in Figure 2, the cross-section being taken on the plane of line 6—6 in Figure 5.

Figure 7 is a fragmentary view in elevation taken from line 7—7 in Figure 5.

Figure 8 is a plan view taken at station B as that station is indicated in Figure 2.

Figure 9 is a view in cross-section taken on the plane of line 9—9 in Figure 6.

Figure 15 is a plan view taken in the vicinity between stations C and D as those stations are indicated in Figure 2.

Figure 16 is a detail fragmentary view of a portion of Figure 15 illustrating an alternative position of certain of the parts.

Figure 17 is a cross-sectional transverse elevation taken from the plane of line 17—17 in Figure 18.

Figure 18 is a side cross-sectional elevation taken from the plane of line 18—18 in Figure 17, both Figures 17 and 18 illustrating the same vicinity as does Figure 15.

Figure 19 is a detail view showing one of the small dogs or lugs 56 in a different position that than seen in Figure 18.

Figure 20 is a cross-sectional transverse elevation taken from the plane of line 20—20 in Figure 15.

Figure 21 is a side elevation partly broken away showing the apparatus in the vicinity of that illustrated in Figure 15.

Figure 22 is a transverse elevation partly in cross-section taken from the plane of line 22—22 in Figure 21.

Figure 23 is a detail view in cross-section taken from the plane of line 23—23 in Figure 22.

Figure 24 is a detail fragmentary diagrammatic view taken from line 24—24 in Figure 25.

Figure 28 is a perspective view of a container formed by assembling the box sections formed from the blanks shown in Figures 26 and 27.

Figure 29 is a cross-sectional view of the container shown in Figure 28.

Figure 30 is a section taken from the plane of line 30—30 in Figure 29.

Figure 31 is an inverted plan section taken from the plane of line 31—31 in Figure 30.

Figure 5:
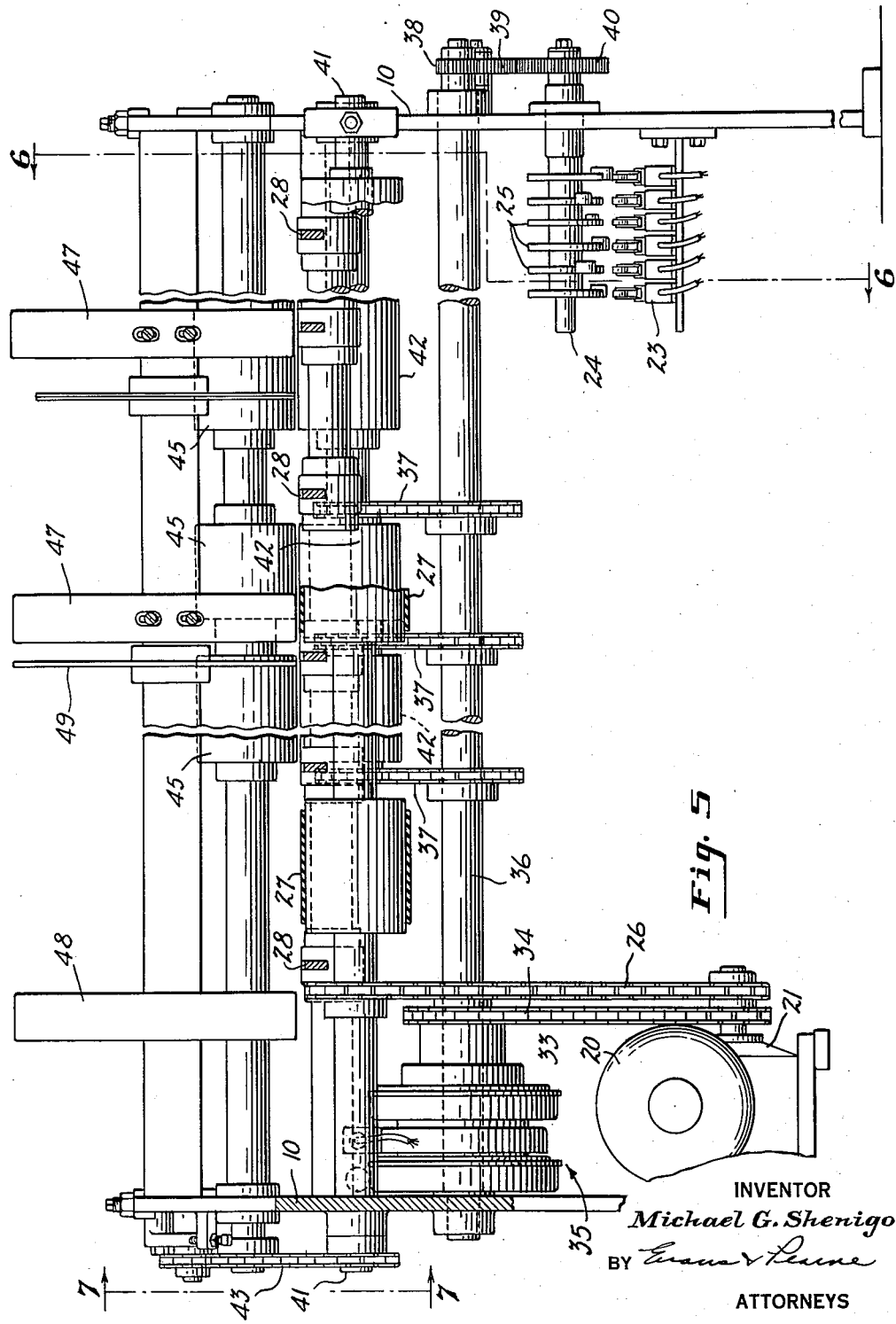
Figure 5 is a cross-sectional view taken from the plane of line 5—5 in Figure 6.
Figure 10:
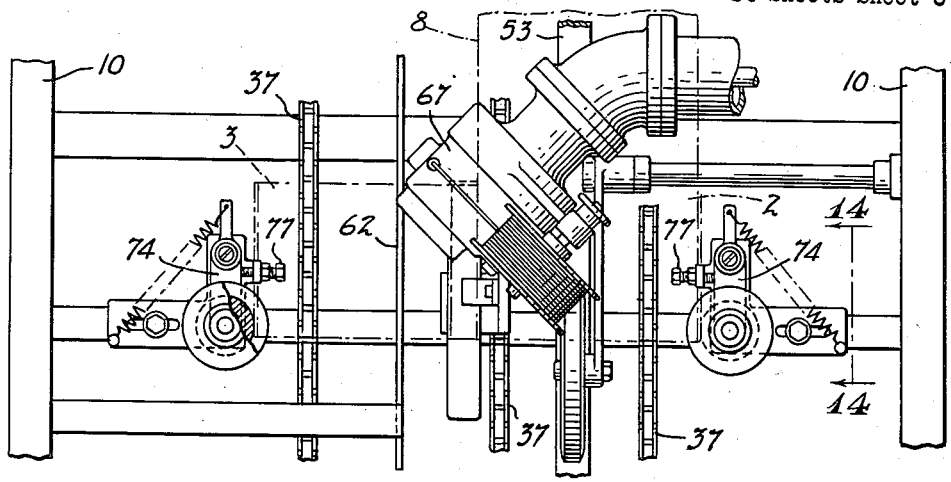
Figure 10 is a plan view taken at the upstream portion of station C as that station is indicated in Figure 2.

In order to facilitate and condense description of the invention, the following discussion of the drawings will specify reference numerals of the various parts and in parentheses will specify by number the figure or figures of the drawings in which such reference numerals may be found. For example, "motor 20 (2, 3, 5, 6)" signifies that the particular object mentioned is given the reference numeral 20 and is to be conveniently found in Figures 2, 3, 5 and 6.

A type of paperboard carton or container with which the invention is particularly adapted to be utilized is illustrated in Figures 26–31. The illustrated carton is made up of a pair of blanks including a blank for the outer or cover section shown in Figure 26 and a blank for the inner section shown in Figure 27. The blank shown in Figure 26 and also seen in Figure 1 comprises first and second endward tube panels 2 and 3, respectively, and first and second centerward tube panels 1 and 4, respectively, and also comprises a seam tab 9 hinged to one of the endward tube panels, the seam tab 9 being hinged to the endward tube panel 2 in the particular blank illustrated. Each cover section blank also has a guiding edge 11 aligned with the central hinge line between the first and second centerward tube panels 1 and 4.

Figure 27:
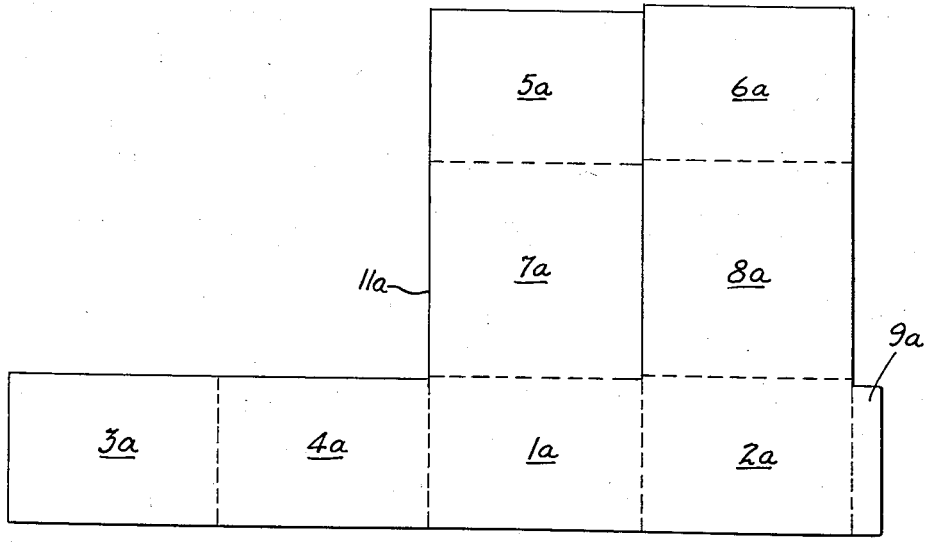
Figure 27 illustrates a blank which may be erected according to the present invention in order to form an inner box section.

The blank shown in Figure 27 comprises first and second endward tube panels 2a and 3a, respectively, and first and second centerward tube panels 1a and 4a, respectively, and also comprises a seam tab 9a hinged to one of the endward tube panels, the seam tab 9a being hinged to the endward tube panel 2a in the particular blank illustrated. Each inner section blank also has a guiding edge 11a aligned with the central hinge line between the first and second centerward tube panels 1a and 4a.

Figure 26:
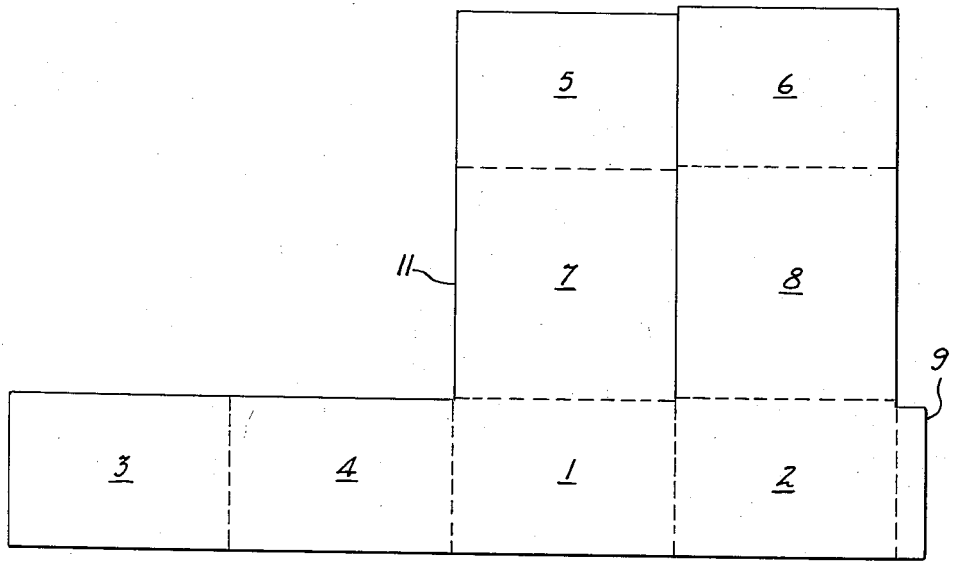
Figure 26 illustrates a blank which may be erected according to the present invention in order to form an outer box section.

The blanks shown in Figures 26 and 27 are to be formed into a cover box section and an inner box section, respectively, which sections are telescoped together to form the assembled container illustrated in Figures 28–31. Each of these inner and outer sections may be folded, seamed and erected on the apparatus to be described herein.

*General organization of the apparatus*

Apparatus embodying the invention is illustrated in side elevation in Figure 2 and in plan view in Figure 3. The apparatus is mounted on suitable frame members generally indicated by the reference numeral 10 (2–10,15, 17,18,20–22,25). The blanks move through the apparatus shown in Figure 2 from left to right and are discharged from the right hand end as erected and formed carton sections. The cartons are supplied to the apparatus by being stacked as in a stack 12 at the left end of the apparatus as seen in Figure 2. The location at which the cartons are stacked and are fed one by one into the apparatus may be designated as a feed station A. The cartons are conveyed from the feed station A at which the stack 12 is located past an infolding station B and a tube-seaming station C to an erecting station D. During such travel, the blanks are infolded, seamed, covered with glue on appropriate surfaces, and erected with their end walls overfolded leaving only two projecting flaps which are adapted to be plowed back into contact with glue-coated surfaces by suitable plowing and back-folding operations which may be accomplished by a chute of compression rollers or the like which also aid in maintaining the carton sections in squared conformation during setting of the glue. This chute apparatus may be adjustable and its location in relation to the presenting box section forming apparatus is seen best in Figure 2 where the chute means comprises the bulky apparatus seen at the right hand end of Figure 2.

The conveying means which will be described more completely below is powered in the particular apparatus illustrated by a motor 20 acting through a suitable speed reducer 21 (2,3,5,6) and through other mechanical linkages to be later described and which extend past the tube-seaming station C and to the erecting station D. Conveying is accomplished from the erecting station by intermittently actuated linkage means to be described below.

The various operations of the apparatus are suitably controlled and timed in sequence by timing cams 25 (5,6) or by microswitches located in various locations throughout the apparatus and which are actuated by movement or contact of certain elements of the apparatus, all as will be described more particularly below.

*Feeding station A*

Powered from the speed reducer 21 through a chain and sprocket linkage 26 (4–6) is an array of endless belts 27 (3–6) which run constantly so long as the motor 20 is running. The lowermost carton blank at the stack 12 is temporarily held out of contact with the belts 27 by rocker bars 28 which fit on a shaft 29 and which are adapted to be lifted at their opposite ends by cranks 30 (4, 6) which are keyed to a shaft 31 which is in turn oscillated by a hydraulic cylinder 32. The solenoid-actuated control valve for the hydraulic cylinder 32 is suitably timed by one of the cams 25.

Leading from the speed reducer 21 is another chain and sprocket linkage 34 (5, 6) which drives the input sleeve 33 of an electrically actuated clutch-and-brake 35 of any well known conventional type which is adapted to alternately transmit torque and apply braking for almost instantaneous stopping to the output of the torque transmitting linkage. The shaft 36 receives the output torque of the clutch-and-brake 35 and is engaged in driving relation with the chain and sprocket linkages 37 (3,5,6,8–10,15,17,18). Two of the endless chains associated with these linkages 37 extend down to the erecting station D, while the third such chain terminates in the middle portion of the seaming station C in the particular apparatus illustrated.

The opposite end of the shaft 36 is linked through suitable reducing gears 38, 39 and 40 (2,5) in driving relationship with a cam shaft 24 which carries the timing cams 25. The chain and sprocket linkages 37 also are drivingly engaged with a shaft 41 (5–7) on which are keyed lower feed rolls 42. Through a chain and sprocket linkage 43, the shaft 41 drives an additional shaft 44 to which are keyed upper feed rolls 45 (3,5–7).

Positioned immediately above the level of the endless belts 27 and the long top reaches of the linkages 37 is a barrier plate or transverse member 47 (6) which is adapted to engage the front or leading ends of the panels 5 and 6 of the blanks in the stack 12. Another transverse plate or barrier 48 is adapted to be engaged by the leading edge of the panels 3 and 4 of the blanks being processed. The guiding edge 11 of the blanks being processed are received against a longitudinally extending guide plate 49. These members are supported on a cross bar 50 by means of brackets seen most clearly in Figure 6 and as illustrated may be rendered suitably adjustable by set screws or the like associated with the brackets.

Immediately beyond the feed rolls 42 and 45 is another cross bar 52 (1,6,9) spaced just above the level to which the blanks are fed to the infolding station B. Supported below this cross bar 52 is a longitudinally extending strap 53 (1,3,6,8–10,13,15,17) which terminates at a heavy and therefore expanded end portion or floating hold-down means 54 (1,3,15).

Extending along a central reference line, the direction of which is indicated by the reference symbol R in Figure 1, are a plurality of guide means which in the illustrated apparatus comprise small dogs or lugs 56 (1–3), 9,18,19) which may be spring-urged as by springs 57 (18,19) into upright position but which are engageable by the leading edge of the panel 4 to be depressed as illustrated in Figure 19. It will be understood that the lug face which is seen in Figure 19 comprises the guide face which is engaged in guided relationship by the guiding edge 11 or 11a of each of the blanks being fed through the machine.

The endless chain linkages 37 engage the successive carton blanks supplied from the feeding station A by means of small upstanding fingers 58 (12,17,21) secured on links of the chains at appropriately spaced intervals.

Infolding station B

Solenoid-operated cylinders 60 and 61 (6,8,9) are supported by the framework of the apparatus and are controlled by the timing cams 25. Each of the cylinders 60 and 61 has associated with it a drive ratchet 63. Each drive ratchet 63 actuates a spur gear drivingly associated with an infolding bar 64 (3,6,8,9). The infolding bars are adapted to engage the first and second endward tube panels 2 and 3 of the blanks being processed to infold them so that they meet each other at the central reference line R as indicated in Figure 1.

Hold-down fins 65 (2,6,9) are provided and are mounted for pivoting movement about horizontal axes. The fins 65 may be supported on a bracket 66 (9) for adjustment of their transverse position in the manner indicated in the drawings. The fins 65 are displaceable by the endward tube panels 2 and 3 as they are infolded but are adapted to swing or spring back to the position shown in Figure 9 to hold these panels in their infolded position as they move away from the infolding station B. Thereafter these panels may be held down by a longitudinally extending hold-down bar 62 (10,13) and/or other suitable hold-down members such as the wheel 59 (2).

Tube-seaming station C

Figures 11, 12, 13:
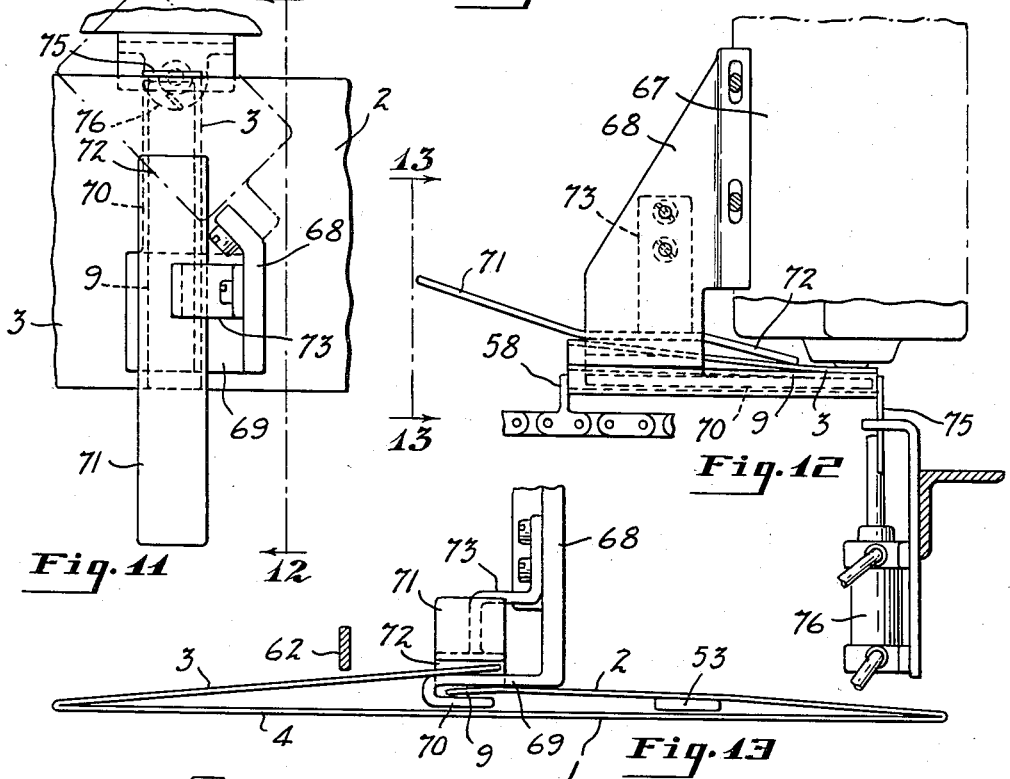
Figure 11 is a detail view of the anvil member associated with the stapling head shown in Figure 10, the stapling head itself being omitted for purposes of illustration.
Figure 12 is a side elevational view taken on line 12—12 in Figure 11.
Figure 13 is a cross-section elevational view taken on line 13—13 in Figure 12.
Figure 14:
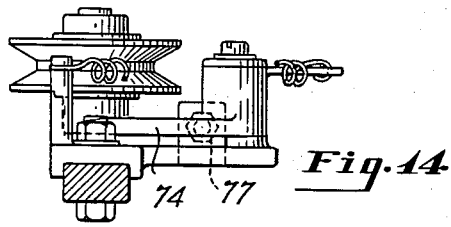
Figure 14 is a detail elevation taken on the plane of line 14—14 in Figure 10.
Figure 25:
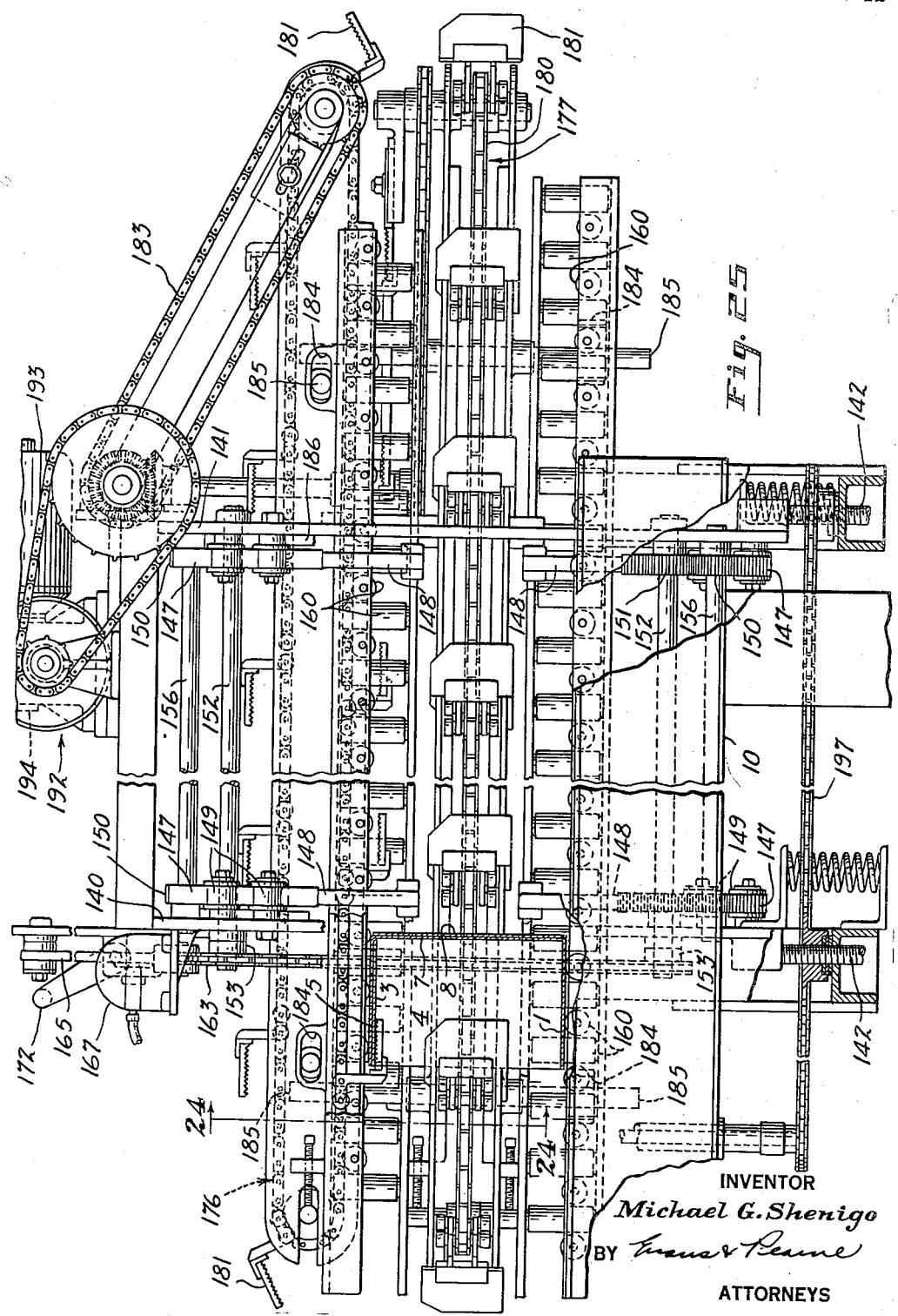
Figure 25 is a side elevation partly broken away of the apparatus seen in Figure 22.

Extending at the station C over the path of travel of the successive carton blanks which have been infolded at the station B is a wire stapling head 67 (1,3,10,12) of a conventional type to which is fixed bracket means comprising the elements 68 and 73 (11–13), the element 68 having a laterally extending portion 69 (13) at its lower end and a trailing portion 70 below the portion 69 and extending in a downstream direction from the remainder of the bracket. The trailing portion 70 forms the anvil for the stapling head and the portion 69 provides support for the anvil 70 by extending laterally inwardly between the panel 3 on the one hand and the panel 2 together with its seam tab 9 on the other hand. The panel 3 is suitably guided by leading and trailing plow guide portions 71 and 72 associated with the element 68. The arrangement of the parts is such that immediately below the stapling head the panel 3 and seam tab 9 may come together as illustrated in Figure 12 to receive a staple applied by the stapling head 67, support being provided by the anvil 70.

It is desirable to provide a forwardly located stop or abutment for the infolded carton blanks as they arrive under the stapling head to receive the first staple in order to assure that the panel 3 and the seam tab 9 will not be skewed even slightly with relation to each other so that the first staple will be applied with the blank in a perfectly squared condition. Accordingly, there may be provided an abutment member 75 (11, 12) actuated by a solenoid-controlled hydraulic cylinder 76 (12) timed by one of the cams 25. The stapling head itself is also timed from the timing cams 25. The arrangement may be such that the conveyor stops the line by disengaging the brake clutch 35 as each carton blank arrives under the stapling head, in the position shown in Figure 12, and that at the time of this arrival the abutment member 75 is in raised position, and that incident to such stopping of the line the stapling head is actuated once. This is accomplished in an obvious manner by suitably contouring the control cams 25. Through a time delay switch associated with the control solenoid for the actuating cylinders 76, this cylinder is retracted to withdraw the abutment member 75 immediately after the stopping of the conveyor. Accordingly, the abutment member 75 is out of the way when the brake clutch 35 is thereafter engaged by the solenoid associated with one of the timing cams 25 to cause the chains 37 to again propel the carton blanks forwardly. The contouring of the associated control cam 25 is such that at this time the stapling head is again actuated several times in quick succession to apply a succession of staples along the seam tab 9 thereby completing its seaming to the panel 3 as the blank is carried under the stapling head and on its way to succeeding operations.

To aid in guiding blanks at the tube-seaming station C, there may be provided a pair of guide wheels (3, 10, 14) mounted on pivoting links 74 and adapted to engage opposite side edges of the blank at the tube-seaming station. The pivoting links 74 are spring-urged as illustrated to move the wheels in the inboard direction, the inner limit of this movement being defined by adjustable stop bolts 77 (10). The sides of the blanks are engaged within the grooves of the illustrated wheels.

In the particular apparatus illustrated, glue is applied to the panels 3 and 4 immediately beyond the stapling head. A pair of glue rolls 78 and 79 (1–3, 15, 17, 18, 21) extend laterally inwardly in slightly spaced relationship from each other and are supplied with glue by conventional means including upper and lower glue trays 80 and 81 (17, 18). The rolls 78 and 79 are powered by a motor 82 through a chain and sprocket linkage 83. Suitable glue circulating and draining plumbing 84 (17) is provided, all as is conventional in applying glue to glue rolls. As is well known, the upper tray 80 is provided with a wiper seal at the juncture of its surface with the associated roll 78 to limit the amount of glue applied to this roll, the viscosity and other factors being such as to prevent undue loss of glue at the juncture of the tray and the roll. The rolls 78 and 79 are of sufficient width to accommodate a variety of widths of the panels 3 and 4.

Erecting station D

The downstream movement of one of the chains 37 terminates immediately before the glue rolls 78 and 79, and the downstream movement of the remaining two chains 37 terminates just beyond the glue rolls, as may be seen most clearly in Figures 15 and 21. The now infolded, seamed and glue-coated blank passes out of contact with the fingers 58 which have been propelling it and slides onto a horizontal surface 87 (15, 20-22) to temporarily remain in flattened aspect with the floating hold-down member 54 resting on the panel 1 of the blank and holding it against the surface 87.

Provided at the erecting station D is a sliding assembly 90 (15,20,21) which is guided in its bodily reciprocating movement by guide rolls 91 (2,20,21) which engage a guide bar 92 (2,15,20,21). The sliding assembly also is guided along a guide rod 93 (2,15,20) and is reciprocated by an actuating cylinder 94 (2,3,20) and its associated actuating rod 95 (2,3,15,21). Located to one side of the surface 87 is a longitudinally extending vertical plate 98 (3,15,20,22), the lateral position of which is adjustable as by a giblock 99 (15,20,21) and associated brackets.

Also positioned at the erecting station is a knock-up bar 100 (3,15,20,21) which is actuated by an associated solenoid-controlled actuating cylinder 101 (15,20) which in turn is governed by one of the timing cams 25. Mounted on suitable bracket members adjacent the vertical plate is a pivoting arm or paddle 104 (15,16,20) which is adapted to pivot about a vertical axis between the open position shown in Figures 15 and 20 and the closed position shown in Figure 16 in which latter position the paddle 104 is urged against the vertical plate 98 toward the leading end of the vertical plate 98. The paddle 104 is actuated by a solenoid-controlled cylinder 105 which in turn is controlled by a microswitch 106 associated with a lost motion spring 107 which extends over the top edge of the vertical plate 98 as seen most clearly in Figures 15 and 20. The same microswitch 106 activates and de-activates (preferably through a short-interval time delay relay or equivalent time delay element) the solenoid control for another actuating cylinder 110 (15,21) which is mechanically linked to a folding bar 111 which pivots about a horizontal transverse axis and which has a transversely projecting portion 112 adapted to engage against the pair of panels 5 and 7.

Placed in a position to be engaged by the linkage associated with the bar 111 as this bar approaches its uppermost position is a microswitch 114 (15,21) which is associated with the solenoid controlling the actuating cylinder 116 (15,20,21) and 94.

Mounted to be engaged by a cam member 117 (20) associated with the sliding assembly 90 is a fixed microswitch 115 (20) so positioned as to be engaged immediately after the sliding assembly 90 begins to move in the downstream direction. This miscroswitch 115 is associated with the control solenoid of the actuating cylinder 116 so that closing of the switch 115 causes the cylinder 116 to be reversed from the direction of actuation which it has been caused to take by the actuation of the microswitch 114. The cylinder 116 is adapted to pivot a bar 118 about a vertical axis, the bar preferably being provided with a roller 119 at its end, as shown.

Closing of the switch 115 also engages the clutch of the brake-and-clutch device 35 to cause the control cams 25 and their controlled linkages to start a cycle of operation.

Carried on the sliding assembly 90 is a spring-loaded linkage 122 (15) which pivots about a vertical axis moving with the sliding assembly 90. The linkage 122 includes a holding bar 123 (15,21). A spring 124 urges the linkage into the position seen in Figure 15, but when the sliding assembly is in its most upstream end position, as shown in Figure 15, a roller arm 125 associated with the linkage 122 engages a stationary pad 126 to cause the bar 123 to be held in retracted position. As the sliding assembly starts in the downstream direction away from the position shown in Figure 15, the arm 125 moves out of engagement with the stationary pad 126 causing the spring 124 to move the holder bar 123 into engagement with the leading end of the erected blank. Toward the opposite extremity of the movement of the sliding assembly 90, a roller arm 128 engages a fixed cam 129 (3,15) to cause the holding bar 123 to be moved outwardly against the tension of the spring 124 to thereby release the carton for further forward movement.

It will be understood that the cylinder 116 is actuated by the microswitch 114 to move the rod 118 inwardly at the same time that the cylinder 94 is actuated to initiate the downstream movement of the sliding assembly 90. As this downstream movement commences, the holder bar 123 moves into engagement with the erected carton blank and immediately thereafter the miscroswitch 115 is engaged by its actuating cam member on the sliding assembly 90 to reverse the cylinder 116 and withdraw the bar 118.

As the sliding assembly 90 approaches the downstream end of its travel, it strikes first and second limit switches 120 and 121 (2). Closing of the limit switch 120 actuates the clutch of a clutch-and-brake device 192 to cause endless paddle linkages 176 and 177 (22) to be activated, all as to be described below. Closing of the limit switch 121 reverses the cylinder 116 to return the sliding assembly 90 to its upstream end position.

The sliding assembly includes a pusher plate 130 (15,20,21) so dimensioned as to engage the trailing edges of the several tube panels 1–4 of the erected blank.

Provided in the surface 87 is a cut-out 132 (15) to accommodate the projecting portion 112 of the folding bar 111. Also provided in the surface 87 is a cut-out 133 through which protrudes slightly a spring 134 which serves to assure that the pair of panels 3 and 4 will be slightly raised as the blank reaches the erecting station D to prevent premature partial cross-folding of the pair of panels 6 and 7. Such premature partial cross-folding would cause the then-lower edges of panels 6 and 7 to interlock with the panels 3 and 4 when the folding bar 111 was actuated, thereby destroying the carton.

*Backfolding and compressing means*

Beyond the erecting station D are located the backfolding and compressing means most clearly seen in Figures 22–25. This in general comprises a chute aligned in the conveying direction, and the chute may be provided with four corners which are movable together and apart to vary the cross-sectional area of the chute.

The apparatus may comprise a pair of rigid frames 140 (22) and 141 (22,25) which may be shifted vertically by the jack shafts 142 which in turn are supported on thrust bearings fixed to the primary stationary frame structure 10. The frames 140 and 141 are supported for their vertical sliding movement at the slide interfaces 145 (22). Supported at a 45° angle at each of the four corners and at both ends of the chute array are racks 147 at the inner ends of which are rigidly fixed angles 148. The racks 147 are adapted to move between associated rollers 149 and idler and drive spur gears 150 (25) and 151, respectively. The drive spur gears 151 are keyed to shafts 152 which are journaled between the frames 140 and 141 and which are powered by sprockets 153. The idler sprockets 150 at corresponding upstream and downstream directions are linked for rotation together through shafts 156.

One or more of the corner brackets or angles may have associated therewith at their upstream end one or more guide rods or plows such as the rod 158 (20,22) to assist in backfolding the panels 5 and 6.

The corner brackets or angle assemblies 148 have associated therewith a series of rollers 160 which are alternately positioned vertically and horizontally to define the actual corners of the chute cross-section, as most clearly seen in Figure 22. It will be clear that by causing the racks 147 to extend and retract the cross-sectional area of the chute is decreased and increased.

The simultaneous movement of the racks 147 is accomplished by driving the sprockets 153 through a chain linkage 163 which is provided with a pin 164 adapted to be driven by a pivoting yoke link 165. The yoke link 165 is powered through a pin and slot connection 166 by a solenoid-controlled hydraulic actuating cylinder 167. Also pinned to the yoke link 165 is a tapped link 168 which threadedly receives a rod 169 (22, 23) on which at another threaded portion thereof are received adjustable stop nuts 170 each having associated therewith a lock nut 171. Keyed to the shaft 169 is a crank 172. The rod 169 extends with a sloppy fit through a shaft block 173 which is preferably provided on either side with end thrust bearings 174 to enable the rod 169 to be turned by means of the crank 172 even when subjected to considerable tension or compression.

The adjustable stop nuts 170 define the stop positions of the hydraulic cylinder 167 so that as the cylinder 167 is reversed, the cross-section of the chute is varied slightly according to the clearance allowed by the stop nuts 170. This degree of movement is sufficient to accommodate the size difference between a cover box section and an inner box section. When it is desired to change the machine from one box size to another box size, the crank 172 is turned causing the rod 169 to draw up into the sleeve 168 to change the datum position of the yoke link 165. With reference to the new datum position, the chutes will remain adjustable back and forth to accommodate inner and outer box section size differences by means of the hydraulic cylinder 167.

Mounted immediately above the chute and to one side thereof are endless paddle linkages generally indicated by the reference numerals 176 and 177 (22). These linkages include sprockets 178 (22, 25) journaled between associated longitudinally extending pairs of side plates 179. Endless chains 180 extend along this structure and have fixed to links thereof at spaced intervals inwardly facing paddle assemblies 181. The upper endless chain 180 and paddle assemblies 181 are driven by a chain and sprocket linkage 183, and the side plates 179 associated therewith are supported by the rods 185 (22, 24, 25) and are allowed to shift slightly longitudinally as by the rod and slot bearing 184 to accommodate the slight horizontal longitudinal shifting of the lower end of the linkage 183 necessary to accommodate vertical movement of the apparatus incident to increasing or decreasing chute cross-section size.

Similarly, the lower or sideward chain 180 and its associated paddles 181 are driven through a chain and sprocket linkage which in turn is powered by a bevel gear and through shaft linkage 190. Again, associated rods 185 and rod and slot connections 184 guide the assembly in its slight longitudinal shifting movement. Brackets 186 welded to the rigid frames 140 also are slidably engaged by the side plates 179 of the linkages 176 and 177.

The linkages 183 and 190 are powered by a clutch-and-brake device 192 which in turn is powered by the motor 193 and speed changer 194. The clutch-and-brake device 192 is of a conventional type and may be similar or identical to the clutch-and-brake 35. Almost instantaneous starting and stopping of the movement of the chains 180 and their associated paddles 181 may thus be accomplished.

The jack shaft 142 may be simultaneously turned by a hand crank 196 through a suitable chain and sprocket linkage 197.

*Operation*

Although most of the operation of the apparatus has been described above, the following description of a complete sequence of operations will perhaps serve to tie together the several operations which have already been described in greater detail.

The blanks located at the feeding station A are stacked so that each of them has the aspect indicated in Figure 1, with its guiding edge 11 abutted against the member 49. The leading edge of the panels 3 and 4 are butted against the transverse plate or barrier 48 and the leading edges of the panels 5 and 6 are abutted against the barrier plate or transverse member 47. When the clutch of the clutch-and-brake device 35 is engaged, actuation of the machine commences, as by closing of the microswitch 115 or by a hand control in the event the machine is being started up. Thereupon the timing cams 25 will complete one full cycle at the end of which a suitable cam surface on one of the cams 25 will operate its associated microswitch 23 to disengage the clutch and engage the brake of the clutch-and-brake device 35 thus stopping all the elements driven from the associated shaft 36. During an operating cycle, the rocker bars 28 are caused to lower and raise to bring the lowermost blank in the stack 12 into engagement with the belts 27 whereby such blank is propelled between the rolls 42 and 45 and to the infolding station B, the back of the blank being engaged along its rear or trailing edge by the small upstanding fingers 58 associated with the chain and sprocket linkages 37. The other blanks in the stack are restrained from forward movement by the barriers 47 and 48.

At the very beginning of the operative cycle, another blank already positioned at the infolding station is infolded by actuation of the cylinders 60 and 61. The sequence of the various operations is preferably such that this infolding is completed as the timing cams 25 start their timing cycle and prior to clutch engagement of the clutch-and-brake device 35 and consequent advancing of the blanks by the conveyor means.

During the operating cycle, the blank which is infolded at the station B is thereupon propelled by the upstanding fingers 58 associated with the chain and sprocket linkages 37 to the seaming station C where it stops with its associated seam tab 9 positioned under the stapling head 67, with the trailing edge of the blank engaged by the fingers 58, and with the leading edge of the blank engaged by the abutment member 75 which has been raised by suitable shaping of one of the timing cams 25. As the blank reaches this position, the cycle is completed by disengaging the clutch of the brake-and-clutch member 35 and engaging the brake thereof, the control being arranged to simultaneously actuate the stapling head once and to thereafter, by a time delay relay or the like, cause the abutment member 75 to be withdrawn.

During the same cycle, a blank previously positioned at the seaming station and previously having received its initial stitch is propelled away from such station to the erecting station D by the small upstanding fingers 58 engaging its trailing edge. The fingers 58 are disengaged from the trailing edge of the blank as it reaches the erecting station D, as indicated in Figure 21. One of the timing cams 25 is shaped to sequence the operation of the hydraulic cylinder 101 so that this cylinder will extend after the blank has been received at the erecting station. Thereafter the sequence in erecting steps occurs independently of timing control from the cams 25 and involves a series of operations initiated by microswitches or time delay arrangements as follows:

When the cylinder 101 is actuated, it raises its associated knock-up bar 100 causing the seamed blank to be erected as indicated schematically in dotted lines in Figure 1 with the pairs of panels 7, 5 and 8, 6 continuing to project forwardly, the spring 134 assuring that the pair of panels 5, 7 will be slightly raised so that as the carton is erected the panels 6, 8 will not have an opportunity to fold in slightly so as to later interlock with the panels 5, 7 to cause destruction of the blank.

As the blank reaches its erect position, the spring 107 is engaged by the panel 2 of the blank and is associated microswitch 106 is thereby closed causing the cylinder 105 to be actuated to bring the paddle 104 into engagement with the inside wall of the panel 2 thereby bringing the blank sharply against the vertical plate 98.

When the microswitch 106 closes, it not only activates the cylinder 105 but also (preferably through a short-interval time delay relay) it actuates the cylinder control for the cylinder 110 causing the folding bar 111 to move upwardly to cross-fold the pair of panels 5 and 7.

As the erected bar 111 nears the end of its movement, the microswitch 114 is engaged thereby causing the actuating cylinder 116 to be extended and the main actuating cylinder 94 to start its retracting motion.

As the sliding assembly 90 moves in the downstream direction incident to the retraction of the actuating cylinder 94, the cam member 117 associated with the sliding assembly 90 engages the fixed microswitch 115. Closing of the microswitch 115 causes the actuating cylinder 116 to reverse from the direction of actuation initiated by the microswitch 114. Initial actuation of the cylinder 116 causes the bar 118 to move inwardly to infold the pair of panels 6 and 8. As the sliding assembly continues its initial movement in the downstream direction, the linkage 122 is caused to pivot inwardly so that the holding bar 123 maintains the pair of panels 6 and 8 in infolded position with the pair of panels 5 and 7 caught thereunder. This infolded condition is maintained as the holding bar 123 moves bodily along with the sliding assembly 90, even though the infolding bar 118 has meanwhile been retracted.

Closing of the microswitch 115 also engages the clutch of the brake-and-clutch device 35 to start another cycle at the upstream end of the apparatus.

As the sliding assembly reaches its downstream limiting position, it strikes the microswitch 120 thereby engaging the clutch of the clutch-and-brake device 192 and starting the paddle linkages 176 and 177 in motion properly timed in sequence with the arrival of the erected blank at the backfolding and compressing means. As the blank arrives, the protruding flaps 5 and 6 are folded back into engagement with the outer sides of the panels 3 and 4, which outer sides have received a coating of glue by having passed between the glue rolls 78 and 79.

As the sliding assembly 90 completes its downstream movement, it engages the microswitch 121 which reverses the cylinder 94 and returns the entire sliding assembly 90 toward its upstream limiting position where it remains for receipt of a succeeding blank and actuation of the cylinder 101 at the conclusion of a subsequent cycling of the timing cams 25.

The erected blank which has now been just received at the backfolding and compressing apparatus is engaged by a pair of the paddles 181 and is carried thereby along the chute defined by the rolls 160. The cross-sectional dimension of this chute is such as to compress the panels 5 and 6 against the panels 3 and 4, respectively. After a certain degree of progression of the paddles 181, a microswitch 198 (2) is engaged by one member of one of the trains of equally spaced paddles to cause the clutch of the brake-and-clutch device 192 to disengage thereby stopping the paddle linkages 176 and 177 in a position to be properly subsequently sequenced with the arrival of a succeeding blank by subsequent closing of the microswitch 120. After several cycles of operation, the blank in question will arrive at the output end of the compressing apparatus to be discharged therefrom.

If it is desired to form inner box sections from the blank shown in Figure 27, it is only necessary to actuate the cylinder 167 to cause the corners defined by the rollers 160 to be moved inwardly slightly, the inward stop position being defined by one of the nuts 170. Despite the difference between the dimensions of the panels 1a—8a and the dimensions of the panels 1—8, the mode of operation of the apparatus will be the same since the operations will occur with reference to the guide edge 11a of the blanks for the inner box section and the guiding and seaming operations will occur along the central reference line R.

For greater changes in the size and panel dimensions, as when changing from one container size to another, the cranks 172 and 196 may be actuated to maintain the bottom of the chute defined by the rollers 160 on a level with the surface 87 and to maintain the center of the chute at least approximately centered with the new size of carton which is to be guided into the compressing means by the vertical plate 98. These adjustments are not necessary when changing back and forth between inner and outer box sections of the same size of container. Also, the transverse position of the guide plate 98 may be adjusted by means of the giblock 99.

It will be apparent that many variations in the many details of the illustrated apparatus will be possible without departing from the essential teachings of this disclosure, including the detailed description of one example of the invention set forth above. For example, means may be provided to automatically load the blanks at the station A from a suitable feed chute, or it may be desirable to vary the several plowing arrangements. Accordingly, the invention is not to be limited to these details, but its scope is to be determined by the following claims.

What is claimed is:

1. A machine for forming box sections from blanks each of which comprises four tube panels including first and second endward tube panels and first and second centerward tube panels and also comprises additional panels including a first pair hinged to the first centerward tube panel and having a guiding edge aligned with the central hinge line between the first and second centerward tube panels and a second pair hinged to the first endward tube panel, said machine comprising conveying means to translate each blank in a conveying direction parallel to a central reference line with said central hinge line remaining in alignment with said central reference line and said translation occurring past an infolding station and a tube-seaming station to an erecting station, means for successively feeding said blanks onto said conveying means with said central hinge line of each blank in said alignment with said central reference line, guide means on said central reference line for contacting said guiding edge in guiding relationship but allowing translation of said blanks in said conveying direction, means at said infolding station for infolding said first and second endward tube panels whereby they meet each other at said central reference line, means at said tube-seaming station for seaming said endward tube panels together at said central reference line to complete the fabrication of a collapsed tube, floating hold-down means including at least one elongated member extending in said conveying direction past said infolding and seaming stations and terminating at a free end at said erecting station, said elongated member extending over and along the path of travel of said first centerward tube panels, means for applying glue to said second centerward and second endward tube panels of said collapsed tube, and means for then upfolding said second centerward tube panel to thereby also upfold said first endward tube panel and lift said second endward tube panel whereby said tube is erected while said first centerward tube panel is held down firmly by the weight of said hold-down means, means for thereupon folding around their hinge lines and across the leading end of said tube in laterally projecting relationship therewith said pairs of panels which are hinged to the first centerward and first endward tube panels, and means for then backfolding the projecting portions of said pairs of panels into contact with said applied glue and for holding them there during setting of the glue.

2. Apparatus for manufacturing container box sections from blanks each of which comprises four tube panels including first and second endward tube panels and first and second centerward tube panels and each of which blanks also has a guiding edge aligned with the central hinge line between the first and second centerward tube panels, said machine comprising conveying means to translate each blank in a conveying direction parallel to a central reference line with said central hinge line remaining in alignment with said central reference line and said translation occurring past an infolding station and a tube-seaming station to an erecting station, floating hold-down means including at least one elongated member extending in said conveying direction past said infolding and seaming stations and terminating at a free end at said erecting station, said elongated member extending over and along the path of travel of said first centerward tube panels, means for successively feeding said blanks onto said conveying means and under said elongated member of said floating hold-down means, guide means on said central reference line and comprising guide members normally within the path of movement of passing blanks, said guide members being mounted (1) for displacement out of said path of movement by edges of passing blanks with which said guide members are in interfering relationship and (2) for resistance to displacement by edges of passing blanks with which said guide members are in guiding relationship, whereby said guide means contacts said guiding edge in guiding relationship but allows translation of said blanks in said conveying direction, means at said infolding station for infolding said first and second endward tube panels whereby said tube panels surround said hold-down means, means at said tube-seaming station for seaming said endward tube panels together at said central reference line to complete the fabrication of a collapsed tube, and means at said erecting station for erecting said tube while said first centerward tube panel is held down firmly by the weight of said hold-down means.

3. A machine for forming both the inner and outer box sections of containers comprising two box sections telescoped together one within the other from blanks having one of a plurality of sets of dimensions but each of which comprises four tube panels including first and second endward tube panels and first and second centerward tube panels and also comprises additional panels including a first pair hinged to the first centerward tube panel and having a guiding edge aligned with the central hinge line between the first and second centerward tube panels and a second pair hinged to the first endward tube panel, said machine comprising conveying means to translate each blank in a conveying direction parallel to a central reference line with said central hinge line remaining in alignment with said central reference line and said translation occurring past an infolding station and a tube-seaming station to an erecting station, means for successively feeding said blanks onto said conveying means with said central hinge line of each blank in said alignment with said central reference line, guide means on said central reference line for contacting said guiding edge in guiding relationship but allowing translation of said blanks in said conveying direction, means at said infolding station for infolding said first and second endward tube panels whereby they meet each other at said central reference line, means at said tube-seaming station for seaming said endward tube panels together at said central reference line to complete the fabrication of a collapsed tube, floating hold-down means including at least one elongated member extending in said conveying direction past said infolding and seaming stations and terminating at a free end at said erecting station, said elongated member extending over and along the path of travel of said first centerward tube panels, means for applying glue to said second centerward and second endward tube panels of said collapsed tube, and means for then upfolding said second centerward tube panel to thereby also upfold said first endward tube panel and lift said second endward tube panel whereby said tube is erected while said first centerward tube panel is held down firmly by the weight of said hold-down means, means for thereupon folding around their hinge lines and across the leading end of said tube in laterally projecting relationship therewith said pairs of panels which are hinged to the first centerward and first endward tube panels, and means for then backfolding the projecting portions of said pairs of panels into contact with said applied glue and for holding them there during setting of the glue, said last-named means comprising a chute aligned in said conveying direction, said chute having four corners, means to move the corners of said chute together and apart to vary the cross-sectional area of said chute according to whether inner or outer box sections are being received.

4. In a machine for making paperboard box sections from blanks each of which comprises four tube panels including first and second endward tube panels and first and second centerward tube panels and each of which blanks also comprises a seam tab hinged to one of the endward tube panels and each of which blanks also has a guiding edge aligned with the central hinge line between the first and second centerward tube panels, said machine comprising conveying means to translate each blank in a conveying direction parallel to a central reference line with said central hinge line remaining in alignment with said central reference line and said translation occurring past an infolding station and a tube-seaming station to an erecting station, means for successively feeding said blanks onto said conveying means with said central hinge line of each blank in said alignment with said central reference line, guide means on said central reference line for contacting said guiding edge in guiding relationship but allowing translation of said blanks in said conveying direction, means at said infolding station for infolding said first and second endward tube panels over said first and second centerward tube panels, respectively, with said seam tab lapping at said central reference line the free end of the endward tube panel to which it is not hinged, means at said tube-seaming station for stapling said seam tab now located at said central reference line to the endward tube panel to which it is not hinged to complete the fabrication of a collapsed tube, floating hold-down means including at least one elongated member extending in said conveying direction past said infolding and seaming stations and terminating at a free end at said erecting station, said elongated member extending over and along the path of travel of said first centerward tube panels, means for applying glue to said second centerward and second endward tube panels of said collapsed tube, and means for then upfolding said second centerward tube panel to thereby also upfold said first endward tube panel and lift said second endward tube panel whereby said tube is erected while said first centerward tube panel is held down firmly by the weight of said hold-down means, means for thereupon folding around their hinge lines and across the leading end of said tube in laterally projecting relationship therewith said pairs of panels which are hinged to the first centerward and first endward tube panels, and means for then backfolding the projecting portions of said pairs of panels into contact with said applied glue and for holding them there during setting of the glue.

5. Box section forming apparatus for manufacturing paperboard box sections from blanks each of which comprises four tube panels including first and second endward tube panels and first and second centerward tube panels and also comprises additional panels including a first pair hinged to the first centerward tube panel and having a guiding edge aligned with the central hinge line between the first and second centerward tube panels and a second pair hinged to the first endward tube panel, said machine comprising conveying means to translate each blank in a conveying direction parallel to a central reference line with said central hinge line remaining in alignment with said central reference line and said translation occurring past an infolding station and a tube-seaming station to an erecting station, means for successively feeding said blanks onto said conveying means with said central hinge line of each blank in said alignment with said central reference line, guide means on said central reference line for contacting said guiding edge in guiding relationship but allowing translation of said blanks in said conveying direction, means at said infolding station for infolding said first and second endward tube panels whereby they meet each other at said central reference line, means at said tube-seaming station for seaming said endward tube panels together at said central reference line to complete the fabrication of a collapsed tube, means for applying glue to said second centerward and second endward tube panels of said collapsed tube, means at said erecting station for erecting said tube, means for thereupon folding around their hinge lines and across the leading end of said tube in laterally projecting relationship therewith said pairs of panels which are hinged to the first centerward and first endward tube panels, and means for then backfolding the projecting portions of said pairs of panels into contact with said applied glue and for holding them there during setting of the glue.

6. Apparatus for forming both sections of paperboard containers which comprise inner and outer box sections received one within the other and made from blanks having one of a plurality of sets of dimensions but each of which comprises four tube panels including first and second endward tube panels and first and second centerward tube panels and also comprises additional panels including a first pair hinged to the first centerward tube panel and a second pair hinged to the first endward tube panel, said machine comprising conveying means to translate each blank in a conveying direction parallel to the hinge lines between said four tube panels with said pairs of panels leading said tube panels, means for successively feeding said blanks onto said conveying means, guide means for guiding said blanks in said conveying direction, means for infolding said first and second endward tube panels and then seaming said endward tube panels together to complete the fabrication of a collapsed tube, means for applying glue to said second centerward and second endward tube panels of said collapsed tube, means for then erecting said tube, means for thereupon folding around their hinge lines and across the leading end of said tube in laterally projecting relationship therewith said pairs of panels which are hinged to the first centerward and first endward tube panels, and means for then backfolding the projecting portions of said pairs of panels into contact with said applied glue and for holding them there during setting of the glue, said last-named means comprising a chute aligned in said conveying direction, said chute having four corners, means to move the corners of said chute together and apart to vary the cross-sectional area of said chute according to whether inner or outer box sections are being received.

7. A container fabricating machine for manufacturing inner and outer box sections which are telescoped together to constitute containers, said box sections being made from blanks having one of a plurality of sets of dimensions but each of which comprises four tube panels including first and second endward tube panels and first and second centerward tube panels and each of which blanks also comprises a seam tab hinged to one of the endward tube panels and also comprises additional panels including a first pair hinged to the first centerward tube panel and having a guiding edge aligned with the central hinge line between the first and second centerward tube panels and a second pair hinged to the first endward tube panel, said machine comprising impelling means to translate each blank in a conveying direction parallel to a central reference line with said central hinge line remaining in alignment with said central reference line and said translation occurring past an infolding station and a tube-seaming station to an erecting station, floating hold-down means including at least one elongated member extending in said conveying direction past said infolding and seaming stations and terminating at a free end at said erecting station, said elongated member extending over and along the path of travel of said first centerward tube panels, means for successively feeding said blanks into driven association with said impelling means with said central hinge line of each blank in said alignment with said central reference line, said last-named means including a magazine for holding a stack of said blanks above a leading portion of said impelling means with their said central hinge lines aligned with said central reference line, a barrier extending across said impelling means and spaced thereabove only sufficiently to admit thereunder one blank at a time, means supporting said stack and moving up from the level of said leading portion of said impelling means and back down to said level whereby said blanks are successively picked off the bottom of said stack and translated under said barrier means and under said elongated member of said floating hold-down means, guide means on said central reference line for contacting said guiding edge in guiding relationship but allowing translation of said blanks in said conveying direction, means at said infolding station for infolding said first and second endward tube panels over said first and second centerward tube panels, respectively, with said seam tab lapping at said central reference line the free end of the endward tube panel to which it is not hinged whereby said tube panels surround said hold-down means, means at said tube-seaming station for stapling said seam tab now located at said central reference line to the endward tube panel to which it is not hinged to complete the fabrication of a collapsed tube, means for applying glue to said second centerward and second endward tube panels of said collapsed tube, and means at said erecting station for upfolding said second centerward tube panel to thereby also upfold said first endward tube panel and lift said second endward tube panel whereby said tube is erected while said first centerward tube panel is held down firmly by the weight of said hold-down means, means for thereupon folding around their hinge lines and across the leading end of said tube in laterally projecting relationship therewith said pairs of panels which are hinged to the first centerward and first endward tube panels, and means for then backfolding the projecting portions of said pairs of panels into contact with said applied glue and for holding them there during setting of the glue, said last-named means comprising a chute aligned in said conveying direction, said chute having four corners, means to move the corners of said chute together and apart to vary the cross-sectional area of said chute according to whether inner or outer box sections are being received, two sets of clamping pads and means for mounting and moving the pads in each set successively along the length of the chute in apposition to two sides thereof including the top side and a lateral side corresponding to said second centerward tube panel, and means to shift the datum of said means to move the corners of the chute together and apart whereby the machine may form both the inner and outer dimensionally different sections for each of a plurality of different sizes of containers.

8. Container-making apparatus to make both box sections of a container comprising inner and outer box sections from blanks having one of a plurality of sets of dimensions but each of which comprises four tube panels including first and second endward tube panels and first and second centerward tube panels and also comprises additional panels including a first pair hinged to the first centerward tube panel and a second pair hinged to the first endward tube panel, said machine comprising conveying means to translate each blank in a conveying direction parallel to the hinge lines between said four tube panels with said pairs of panels leading said tube panels, means for successively feeding said blanks onto said conveying means, guide means for guiding said blanks in said conveying direction, means for infolding said first and second endward tube panels and then seaming said endward tube panels together to complete the fabrication of a collapsed tube, means for applying glue to said second centerward and second endward tube panels of said collapsed tube, means for then erecting said tube, means for thereupon folding around their hinge lines and across the leading end of said tube in laterally projecting relationship therewith said pairs of panels which are hinged to the first centerward and first endward tube panels, and means for then backfolding the projecting portions of said pairs of panels into contact with said applied glue and for holding them there during setting of the glue, said last-named means comprising a chute aligned in said conveying direction, said chute having four corners, means to move the corners of said chute together and apart to vary the cross-sectional area of said chute according to whether inner or outer box sections are being received, two sets of clamping pads and means for mounting and moving the pads in each set successively along the length of the chute in apposition to two sides thereof including the top side and a lateral side corresponding to said second centerward tube panel, and means to shift the datum of said means to move the corners of the chute together and apart whereby the machine may form both the inner and outer dimensionally different sections for each of a plurality of different sizes of containers.

9. Apparatus for manufacturing container box sections from blanks each of which comprises four tube panels including first and second endward tub panels and first and second centerward tube panels and each of which blanks also comprises a seam tab hinged to one of the endward tube panels and also comprises additional panels including a first pair hinged to the first centerward tube panel and having a guiding edge aligned with the central hinge line between the first and second centerward tube panels and a second pair hinged to the first endward tube panel, said machine comprising impelling means to translate each blank in a conveying direction parallel to a central reference line with said central hinge line remaining in alignment with said central reference line and said translation occurring past an infolding station and a tube-seaming station to an erecting station, floating hold-down means including at least one elongated member extending in said conveying direction past said infolding and seaming stations and terminating at a free end at said erecting station, said elongated member extending over and along the path of travel of said first centerward tube panels, means for successively feeding said blanks into driven association with said impelling means with said central hinge line of each blank in said alignment with said central reference line, said last-named means including a magazine for holding a stack of said blanks above a leading portion of said impelling means with their said central hinge lines aligned with said central reference line, a barrier extending across said impelling means and spaced thereabove only sufficiently to admit thereunder one blank at a time, means supporting said stack and moving up from the level of said leading portion of said impelling means and back down to said level whereby said blanks are successively picked off the bottom of said stack and translated under said barrier means and under said elongated member of said floating hold-down means, guide means on said central reference line for contacting said guiding edge in guiding relationship but allowing translation of said blanks in said conveying direction, means at said infolding station for infolding said first and second endward tube panels over said first and second centerward tube panels, respectively, with said seam tab lapping at said central reference line the free end of the endward tube panel to which it is not hinged whereby said tube panels surround said hold-down means, means at said tube-seaming station for stapling said seam tab now located at said central reference line to the endward tube panel to which it is not hinged to complete the fabrication of a collapsed tube, means for applying glue to said second centerward and second endward tube panels of said collapsed tube, and means at said erecting station for upfolding said second centerward tube panel to thereby also upfold said first endward tube panel and lift said second endward tube panel whereby said tube is erected while said first centerward tube panel is held down firmly by the weight of said hold-down means, means for thereupon folding around their hinge lines and across the leading end of said tube in laterally projecting relationship therewith said pairs of panels which are hinged to the first centerward and first endward tube panels, and means for then backfolding the projecting portions of said pairs of panels into contact with said applied glue and for holding them there during setting of the glue, said last-named means comprising a chute aligned in said conveying direction, and two sets of clamping pads and means for mounting and moving the pads in each set successively along the length of the chute in apposition to two sides thereof including the top side and a lateral side corresponding to said second centerward tube panel.

10. A machine for forming box sections from blanks each of which comprises four tube panels including first and second endward tube panels and first and second centerward tube panels and each of which blanks also has a guiding edge aligned with the central hinge line between the first and second centerward tube panels, said machine comprising conveying means to translate each blank in a conveying direction parallel to a central reference line with said central hinge line remaining in alignment with said central reference line and said translation occurring past an infolding station and a tube-seaming station to an erecting station, means for successively feeding said blanks onto said conveying means with said central hinge line of each blank in said alignment with said central reference line, guide means on said central reference line and comprising guide members normally within the path of movement of passing blanks, said guide members being mounted (1) for displacement out of said path of movement by edges of passing blanks with which said guide members are in interfering relationship and (2) for resistance to displacement by edges of passing blanks with which said guide members are in guiding relationship, whereby said guide means contacts said guiding edge in guiding relationship but allows translation of said blanks in said conveying direction, means at said infolding station for infolding said first and second endward tube panels whereby they meet each other at said central reference line, means at said tube-seaming station for seaming said endward tube panels together at said central reference line to complete the fabrication of a collapsed tube, and means at said erecting station for erecting said tube.

11. A machine for forming box sections from blanks each of which comprises four tube panels including first and second endward tube panels and first and second centerward tube panels and also comprises additional panels including a first pair hinged to the first centerward tube panel and a second pair hinged to the first endward tube panel, said machine comprising conveying means to translate each blank in a conveying direction parallel to the hinge lines between said four tube panels with said pairs of panels leading said tube panels, means for successively feeding said blanks onto said conveying means, guide means for guiding said blanks in said conveying direction, means for infolding said first and second endward tube panels and then seaming said endward tube panels together to complete the fabrication of a tube, means for applying glue to said second centerward and second endward tube panels of said tube, means for erecting said tube, means for thereupon folding around their hinge lines and across the leading end of said tube in laterally projecting relationship therewith said pairs of panels which are hinged to the first centerward and first endward tube panels, and means for then backfolding the projecting portions of said pairs of panels into contact with said applied glue and for holding them there during setting of the glue.

12. In a machine for making paperboard box sections from blanks each of which comprises four tube panels including first and second endward tube panels and first and second centerward tube panels and each of which blanks also has a guiding edge aligned with the central hinge line between the first and second centerward tube panels, said machine comprising impelling means to translate each blank in a conveying direction parallel to a central reference line with said central hinge line remaining in alignment with said central reference line and said translation occurring past an infolding station and a tube-seaming station to an erecting station, floating hold-down means including at least one elongated member extending in said conveying direction past said infolding and seaming stations and terminating at a free end at said erecting station, said elongated member extending over and along the path of travel of said first centerward tube panels, means for successively feeding said blanks into driven association with said impelling means with said central hinge line of each blank in said alignment with said central reference line, said last-named means including a magazine for holding a stack of said blanks above a leading portion of said impelling means with their said central hinge lines aligned with said central reference line, a barrier extending across said impelling means and spaced thereabove only sufficiently to admit thereunder one blank at a time, means supporting said stack and moving up from the level of said leading portion of said impelling means and back down to said level whereby said blanks are successively picked off the bottom of said stack and translated under said barrier means and under said elongated member of said floating hold-down means, guide means on said central reference line and comprising guide members normally within the path of movement of passing blanks, said guide members being mounted (1) for displacement out of said path of movement by edges of passing blanks with which said guide members are in interfering relationship and (2) for resistance to displacement by edges of passing blanks with which said guide members are in guiding relationship, whereby said guide means contacts said guiding edge in guiding relationship but allows translation of said blanks in said conveying direction, means at said infolding station for infolding said first and second endward tube panels whereby they meet each other at said central reference line and whereby said tube panels surround said hold-down means, means at said tube-seaming station for seaming said endward tube panels together at said central reference line to complete the fabrication of a collapsed tube, and means at said erecting station for erecting said tube while said first centerward tube panel is held down firmly by the weight of said hold-down means.

13. A machine for forming both the inner and outer box sections of containers comprising two box sections telescoped together one within the other from blanks having one of a plurality of sets of dimensions but each of which comprises four tube panels including first and second endward tube panels and first and second centerward tube panels and also comprises additional panels including a first pair hinged to the first centerward tube panel and having a guiding edge aligned with the central hinge line between the first and second centerward tube panels and a second pair hinged to the first endward tube panel, said machine comprising impelling means to translate each blank in a conveying direction parallel to a central reference line with said central hinge line remaining in alignment with said central reference line and said translation occurring past an infolding station and a tube-seaming station to an erecting station, floating hold-down means including at least one elongated member extending in said conveying direction past said infolding and seaming stations and terminating at a free end at said erecting station, said elongated member extending over and along the path of travel of said first centerward tube panels, means for successively feeding said blanks into driven association with said impelling means with said central hinge line of each blank in said alignment with said central reference line, said last-named means including a magazine for holding a stack of said blanks above a leading portion of said impelling means with their said central hinge lines aligned with said central reference line, a barrier extending across said impelling means and spaced thereabove only sufficiently to admit thereunder one blank at a time, means supporting said stack and moving up from the level of said leading portion of said impelling means and back down to said level whereby said blanks are successively picked off the bottom of said stack and translated under said barrier means and under said elongated member of said floating hold-down means, guide means on said central reference line for contacting said guiding edge in guiding relationship but allowing translation of said blanks in said conveying direction, means at said infolding station for infolding said first and second endward tube panels whereby they meet each other at said central reference line and whereby said tube panels surround said hold-down means, means at said tube-seaming station for seaming said endward tube panels together at said central reference line to complete the fabrication of a collapsed tube, means for applying glue to said second centerward and second endward tube panels of said collapsed tube, and means at said erecting station for upfolding said second centerward tube panel to thereby also upfold said first endward tube panel and lift said second endward tube panel whereby said tube is erected while said first centerward tube panel is held down firmly by the weight of said hold-down means, means for thereupon folding around their hinge lines and across the leading end of said tube in laterally projecting relationship therewith said pairs of panels which are hinged to the first centerward and first endward tube panels, and means for then backfolding the projecting portions of said pairs of panels into contact with said applied glue and for holding them there during setting of the glue, said last-named means comprising a chute aligned in said conveying direction, said chute having four corners, means to move the corners of said chute together and apart to vary the cross-sectional area of said chute according to whether inner or outer box sections are being received.

14. A machine for forming box sections from blanks each of which comprises four tube panels including first and second endward tube panels and first and second centerward tube panels and each of which blanks also comprises a seam tab hinged to one of the endward tube panels and also comprises additional panels including a first pair hinged to the first centerward tube panel and having a guiding edge aligned with the central hinge line between the first and second centerward tube panels and a second pair hinged to the first endward tube panel, said machine comprising impelling means to translate each blank in a conveying direction parallel to a central reference line with said central hinge line remaining in alignment with said central reference line and said translation occurring past an infolding station and a tube-seaming station to an erecting station, floating hold-down means including at least one elongated member extending in said conveying direction past said infolding and seaming stations and terminating at a free end at said erecting station, said elongated member extending over and along the path of travel of said first centerward tube panels, means for successively feeding said blanks into driven association with said impelling means with said central hinge line of each blank in said alignment with said central reference line, said last-named means including a magazine for holding a stack of said blanks above a leading portion of said impelling means with their said central hinge lines aligned with said central reference line, a barrier extending across said impelling means and spaced thereabove only sufficiently to admit thereunder one blank at a time, means supporting said stack and moving up from the level of said leading portion of said impelling means and back down to said level whereby said blanks are successively picked off the bottom of said stack and translated under said barrier means and under said elongated member of said floating hold-down means, guide means on said central reference line for contacting said guiding edge in guiding relationship but allowing translation of said blanks in said conveying direction, means at said infolding station for infolding said first and second endward tube panels over said first and second centerward tube panels, respectively, with said seam tab lapping at said central reference line the free end of the endward tube panel to which it is not hinged whereby said tube panels surround said hold-down means, means at said tube-seaming station for stapling said seam tab now located at said central reference line to the endward tube panel to which it is not hinged to complete the fabrication of a collapsed tube, means for applying glue to said second centerward and second endward tube panels of said collapsed tube, and means at said erecting station for upfolding said second centerward tube panel to thereby also upfold said first endward tube panel and lift said second endward tube panel whereby said tube is erected while said first centerward tube panel is held down firmly by the weight of said hold-down means, means for thereupon folding around their hinge lines and across the leading end of said tube in laterally projecting relationship therewith said pairs of panels which are hinged to the first centerward and first endward tube panels, and means for then backfolding the projecting portions of said pairs of panels into contact with said applied glue and for holding them there during setting of the glue.

15. Apparatus for manufacturing container box sections from blanks each of which comprises four tube panels including first and second endward tube panels and first and second centerward tube panels and each of which blanks also comprises a seam tab hinged to one of the endward tube panels and each of which blanks also has a guiding edge aligned with the central hinge line between the first and second centerward tube panels, said machine comprising conveying means to translate each blank in a conveying direction parallel to a central reference line with said central hinge line remaining in alignment with said central reference line and said translation occurring past an infolding station and a tube-seaming station to an erecting station, means for successively feeding said blanks onto said conveying means with said central hinge line of each blank in said alignment with said central reference line, guide means on said central reference line and comprising guide members normally within the path of movement of passing blanks, said guide members being mounted (1) for displacement out of said path of movement by edges of passing blanks with which said guide members are in interfering relationship and (2) for resistance to displacement by edges of passing blanks with which said guide members are in guiding relationship, whereby said guide means contacts said guiding edge in guiding relationship but allows translation of said blanks in said conveying direction, means at said infolding station for infolding said first and second endward tube panels over said first and second centerward tube panels, respectively, with said seam tab lapping at said central reference line the free end of the endward tube panel to which it is not hinged, means at said tube-seaming station for stapling said seam tab now located at said central reference line to the endward tube panel to which it is not hinged to complete the fabrication of a collapsed tube, and means at said erecting station for erecting said tube.

16. In a machine for making paperboard box sections from blanks each of which comprises four tube panels including first and second endward tube panels and first and second centerward tube panels and also comprises additional panels including a first pair hinged to the first centerward tube panel and having a guiding edge aligned with the central hinge line between the first and second centerward tube panels and a second pair hinged to the first endward tube panel, said machine comprising impelling means to translate each blank in a conveying direction parallel to a central reference line with said central hinge line remaining in alignment with said central reference line and said translation occuring past an infolding station and a tube-seaming station to an erecting station, floating hold-down means including at least one elongated member extending in said conveying direction past said infolding and seaming stations and terminating at a free end at said erecting station, said elongated member extending over and along the path of travel of said first centerward tube panels, means for successively feeding said blanks into driven association with said impelling means with said central hinge line of each blank in said alignment with said central reference line, said last-named means including a magazine for holding a stack of said blanks above a leading portion of said impelling means with their said central hinge lines aligned with said central reference line, a barrier extending across said impelling means and spaced thereabove only sufficiently to admit thereunder one blank at a time, means supporting said stack and moving up from the level of said leading portion of said impelling means and back down to said level whereby said blanks are successively picked off the bottom of said stack and translated under said barrier means and under said elongated member of said floating hold-down means, guide means on said central reference line for contacting said guiding edge in guiding relationship but allowing translation of said blanks in said conveying direction, means at said infolding station for infolding said first and second endward tube panels whereby they meet each other at said central reference line and whereby said tube panels surround said hold-down means, means at said tube-seaming station for seaming said endward tube panels together at said central reference line to complete the fabrication of a collapsed tube, means for applying glue to said second centerward and second endward tube panels of said collapsed tube, and means at said erecting station for upfolding said second centerward tube panel to thereby also upfold said first endward tube panel and lift said second endward tube panel whereby said tube is erected while said first centerward tube panel is held down firmly by the weight of said hold-down means, means for thereupon folding around their hinge lines and across the leading end of said tube in laterally projecting relationship therewith said pairs of panels which are hinged to the first centerward and first endward tube panels, and means for then backfolding the projecting portions of said pairs of panels into contact with said applied glue and for holding them there during setting of the glue.

17. A machine for forming box sections from blanks each of which comprises four tube panels including first and second endward tube panels and first and second centerward tube panels and also comprises additional panels including a first pair hinged to the first centerward tube panel and a second pair hinged to the first endward tube panel, said machine comprising conveying means to translate each blank in a conveying direction parallel to the hinge lines between said four tube panels with said pairs of panels leading said tube panels, means for successively feeding said blanks onto said conveying means, guide means for guiding said each blank in said conveying direction, means for infolding said first and second endward tube panels, means for seaming said endward tube panels together to complete the fabrication of a tube, means for applying glue for panel gluing to said each blank, means for erecting said tube, means for folding around their hinge lines and across the leading end of said tube in laterally projecting relationship therewith said pairs of panels which are hinged to the first centerward and first endward tube panels, and means for backfolding the projecting portions of said two pairs of panels into contact with two sides of said erected tube with said applied glue therebetween and for holding them there during setting of the glue.

18. Box section forming apparatus for manufacturing paperboard box sections from blanks each of which comprises four tube panels including first and second endward tube panels and first and second centerward tube panels and also comprises additional panels including a first pair hinged to the first centerward tube panel and a second pair hinged to the first endward tube panel, said machine comprising conveying means to translate each blank in a conveying direction parallel to the hinge lines between said four tube panels with said pairs of panels leading said tube panels, means for successively feeding said blanks onto said conveying means, guide means for guiding said blanks in said conveying direction, means for infolding said first and second endward tube panels and then seaming said endward tube panels together to complete the fabrication of a collapsed tube, means for applying glue to said second centerward and second endward tube panels of said collapsed tube, means for then erecting said tube, means for thereupon folding around their hinge lines and across the leading end of said tube in laterally projecting relationship therewith said pairs of panels which are hinged to the first centerward and first endward tube panels, and means for then backfolding the projecting portions of said pairs of panels into contact with said applied glue and for holding them there during setting of the glue, said last-named means comprising a chute aligned in said conveying direction, and two sets of clamping pads and means for mounting and moving the pads in each set successively along the length of the chute in apposition to two sides thereof including the top side and a lateral side corresponding to said second centerward tube panel.

19. Apparatus for manufacturing container box sections from blanks each of which comprises four tube panels including first and second endward tube panels and first and second centerward tube panels and each of which blanks also comprises a seam tab hinged to one of the endward tube panels and each of which blanks also has a guiding edge aligned with the central hinge line between the first and second centerward tube panels, said machine comprising impelling means to translate each blank in a conveying direction parallel to a central reference line with said central hinge line remaining in alignment with said central reference line and said translation occurring past an infolding station and a tube-seaming station to an erecting station, floating hold-down means including at least one elongated member extending in said conveying direction past said infolding and seaming stations and terminating at a free end at said erecting station, said elongated member extending over and along the path of travel of said first centerward tube panels, means for successively feeding said blanks into driven association with said impelling means with said central hinge line of each blank in said alignment with said central reference line, said last-named means including a magazine for holding a stack of said blanks above a leading portion of said impelling means with their said central hinge lines aligned with said central reference line, a barrier extending across said impelling means and spaced thereabove only sufficiently to admit thereunder one blank at a time, means supporting said stack and moving up from the level of said leading portion of said impelling means and back down to said level whereby said blanks are successively picked off the bottom of said stack and translated under said barrier means and under said elongated member of said floating hold-down means, guide means on said central reference line and comprising guide members normally within the path of movement of passing blanks, said guide members being mounted (1) for displacement out of said path of movement by edges of passing blanks with which said guide members are in interfering relationship and (2) for resistance to displacement by edges of passing blanks with which said guide members are in guiding relationship, whereby said guide means contacts said guiding edge in guiding relationship but allows translation of said blanks in said conveying direction, means at said infolding station for infolding said first and second endward tube panels over said first and second centerward tube panels, respectively, with said seam tab lapping at said central reference line the free end of the endward tube panel to which it is not hinged whereby said tube panels surround said hold-down means, means at said tube-seaming station for stapling said seam tab now located at said central reference line to the endward tube panel to which it is not hinged to complete the fabrication of a collapsed tube and means at said erecting station for erecting said tube while said first centerward tube panel is held down firmly by the weight of said hold-down means.

20. Apparatus for forming both sections of paperboard containers which comprise inner and outer box sections received one within the other and made from blanks having one of a plurality of sets of dimensions but each of which comprises four tube panels including first and second endward tube panels and first and second centerward tube panels and also comprises additional panels including a first pair hinged to the first centerward tube panel and having a guiding edge aligned with the central hinge line between the first and second centerward tube panels and a second pair hinged to the first endward tube panel, said machine comprising conveying means to translate each blank in a conveying direction parallel to a central reference line with said central hinge line remaining in alignment with said central reference line and said translation occurring past an infolding station and a tube-seaming station to an erecting station, means for successively feeding said blanks onto said conveying means with said central hinge line of each blank in said alignment with said central reference line, guide means on said central reference line for contacting said guiding edge in guiding relationship but allowing translation of said blanks in said conveying direction, means at said infolding station for infolding said first and second endward tube panels whereby they meet each other at said central reference line, means at said tube-seaming station for seaming said endward tube panels together at said central reference line to complete the fabrication of a collapsed tube, floating hold-down means including at least one elongated member extending in said conveying direction past said infolding and seaming stations and terminating at a free end at said erecting station, said elongated member extending over and along the path of travel of said first centerward tube panels, means for applying glue to said second centerward and second endward tube panels of said collapsed tube, and means for then upfolding said second centerward tube panel to thereby also upfold said first endward tube panel and lift said second endward tube panel whereby said tube is erected while said first centerward tube panel is held down firmly by the weight of said hold-down means, means for thereupon folding around their hinge lines and across the leading end of said tube in laterally projecting relationship therewith said pairs of panels which are hinged to the first centerward and first endward tube panels, and means for then backfolding the projecting portions of said pairs of panels into contact with said applied glue and for holding them there during setting of the glue, said last-named means comprising a chute aligned in said conveying direction, said chute having four corners, means to move the corners of said chute together and apart to vary the cross-sectional area of said chute according to whether inner or outer box sections are being received, two sets of clamping pads and means for mounting and moving the pads in each set successively along the length of the chute in apposition to two sides thereof including the top side and a lateral side corresponding to said second centerward tube panel, and means to shift the datum of said means to move the corners of the chute together and apart whereby the machine may form both the inner and outer dimensionally different sections for each of a plurality of different sizes of containers.

References Cited in the file of this patent

UNITED STATES PATENTS

| | | |
|---|---|---|
| 2,268,423 | Rose | Dec. 30, 1941 |
| 2,750,856 | Ferguson et al. | June 19, 1956 |
| 2,898,818 | Shields | Aug. 11, 1959 |